(12) United States Patent
Seegmiller et al.

(10) Patent No.: US 11,964,669 B2
(45) Date of Patent: *Apr. 23, 2024

(54) SYSTEM, METHOD, AND COMPUTER PROGRAM PRODUCT FOR TOPOLOGICAL PLANNING IN AUTONOMOUS DRIVING USING BOUNDS REPRESENTATIONS

(71) Applicant: Argo AI, LLC, Pittsburgh, PA (US)

(72) Inventors: Neal Andrew Seegmiller, Pittsburgh, PA (US); Patrick Stirling Barone, San Francisco, CA (US); Arek Viko Sredzki, San Mateo, CA (US)

(73) Assignee: Argo AI, LLC, Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/322,670

(22) Filed: May 24, 2023

(65) Prior Publication Data

US 2023/0339500 A1 Oct. 26, 2023

Related U.S. Application Data

(63) Continuation of application No. 17/172,530, filed on Feb. 10, 2021, now Pat. No. 11,697,429.

(51) Int. Cl.
*B60W 60/00* (2020.01)
*G01C 21/34* (2006.01)

(52) U.S. Cl.
CPC ....... *B60W 60/001* (2020.02); *G01C 21/3453* (2013.01); *B60W 2556/50* (2020.02)

(58) Field of Classification Search
CPC ............ B60W 60/001; B60W 2556/50; G01C 21/3453
See application file for complete search history.

(56) References Cited

U.S. PATENT DOCUMENTS 7,010,548 B2 * 3/2006 Jones ............... H04L 1/1829
710/28
2016/0375901 A1 * 12/2016 Di Cairano ........ G01C 21/3453
701/26

(Continued)

FOREIGN PATENT DOCUMENTS

| CN | 110766982 A | 2/2020 |
| KR | 102185743 B1 | 12/2020 |
| WO | 2005006123 A2 | 1/2005 |

OTHER PUBLICATIONS

Dey et al., "Contextual Sequence Prediction with Application to Control Library Optimization", Proceedings of Robotics: Science and Systems, Jul. 9, 2012, pp. 1-8, Sydney, Australia.

(Continued)

*Primary Examiner* — Khoi H Tran
*Assistant Examiner* — Tristan J Greiner
(74) *Attorney, Agent, or Firm* — The Webb Law Firm

(57) ABSTRACT

Provided are autonomous vehicles and methods of controlling autonomous vehicles through topological planning with bounds, including receiving map data and sensor data, expanding a topological tree by adding a plurality of nodes to represent a plurality of actions associated with the plurality of constraints, generating a bound based on a constraint in the geographic area, the bound associated with an action for navigating the autonomous vehicle relative to the at least one constraint, storing the bound in a central bound storage, linking a set of bounds of a tree node to the bound via a bound identifier, wherein the first bound is initially linked as an active bound, or alternatively, as an inactive bound after determining it is not the most restrictive bound at any sample index, and control the autonomous vehicle based on the topological tree, to navigate the plurality of constraints.

20 Claims, 8 Drawing Sheets

(56) References Cited

U.S. PATENT DOCUMENTS

| | | |
|---|---|---|
| 2018/0089563 A1* | 3/2018 | Redding ................ G06N 3/006 |
| 2018/0274930 A1 | 9/2018 | Wisbrun et al. |
| 2019/0220015 A1 | 7/2019 | Phillips et al. |
| 2019/0220016 A1 | 7/2019 | Phillips et al. |
| 2019/0250626 A1* | 8/2019 | Ghafarianzadeh ....... G06N 7/01 |
| 2020/0293009 A1* | 9/2020 | Quirynen ............. G05B 13/041 |

OTHER PUBLICATIONS

Paxton et al., "Combining Neural Networks and Tree Search for Task and Motion Planning in Challenging Environments," 2017 IEEE/RSJ International Conference on Intelligent Robots and Systems (IROS), Mar. 22, 2017, pp. 6059-6066, Vancouver, BC, Canada.

Ross et al., "Learning Policies for Contextual Submodular Prediction", Proceedings of the 30th International Conference on Machine Learning, PMLR, May 11, 2013, pp. 1364-1372, vol. 28, Issue 3.

* cited by examiner

SYSTEM, METHOD, AND COMPUTER PROGRAM PRODUCT FOR TOPOLOGICAL PLANNING IN AUTONOMOUS DRIVING USING BOUNDS REPRESENTATIONS

CROSS REFERENCE TO RELATED APPLICATION(S)

This application is a continuation of, and claims priority to, U.S. patent application Ser. No. 17/172,530, filed Feb. 10, 2021, the entire contents of which are incorporated by reference herein.

BACKGROUND

Field

This disclosure relates generally to topological planning and, in some non-limiting embodiments or aspects, to systems, methods, and computer program products for expanding a topological tree and efficiently determining a set of candidate constraint sets for controlling an autonomous vehicle (AV) navigating a roadway.

Description of Related Art

An autonomous vehicle (AV) is required to find an optimal road/lane-level path from the AV's current location to a specified destination (e.g., a goal position, etc.) in a map including a road network. To travel autonomously may require a route. However, navigating a route may involve the creation of at least one trajectory or path through the road network and may require evaluating any number of potential lane changes (for example, the AV may merge into a leftmost lane to make a left turn, perform lane changes to overtake a slower object, etc.), as well as, in-lane maneuvers (for example, tracking behind an object, stopping before a stationary object, steering around a stationary object, etc.).

Creating a trajectory to handle lane changes to account for constraints (e.g., objects in the roadway, other cars, pedestrians, bus stops, train crossings, etc.) in an environment of the AV may involve processing and storing a vast amount of information defining the roadway in electronic memory of an vehicle computing device and calculating a cost function for each of a plurality of constraints in the environment in the surrounding roadway, up to a destination of the vehicle. Such calculations may also take into account a state of the vehicle that includes a location and an orientation of the vehicle and the dynamic capabilities of the AV. Only then, may an obstacle-free trajectory be determined for the AV from its current location to the goal position by minimizing a calculated cost and comparing one or more costs associated with each obstacle-free trajectory.

For performing lane changes, the AV may perform calculations to determine a number of possible candidate trajectories, which may be infinitely expensive in terms of computing cost (e.g., computationally infeasible, etc.) because of the number of variations of transition start/end locations, transition start/end times, steering/speed profiles, and/or the like. In some navigating conditions, such as dense traffic, to successfully complete a lane change may require the AV to make a complex maneuver, for example, to speed up and steer abruptly into a narrow gap between vehicles in the destination lane that is currently several vehicles ahead. If an autonomous driving system only considers a finite number of lane change variations, it is unlikely to plan a successful lane change maneuver in these conditions.

Similarly, for in-lane maneuvers, systems may only sample a finite number of candidate trajectories in the road network, either by discretization or random sampling. Because the number of sampled trajectories is limited, this approach may fail to find a feasible trajectory when one exists, or it may find a suboptimal trajectory, because feasible or optimal trajectories are not sampled.

SUMMARY

Accordingly, disclosed are improved computer-implemented systems, methods, and computer program products for topological planning with bounds representations.

According to non-limiting embodiments or aspects, provided is a computer-implemented method of maneuvering an autonomous vehicle traversing a route on a roadway, comprising: receiving, by the autonomous vehicle, map data and sensor data associated with a plurality of constraints in a geographic area of the autonomous vehicle; expanding, by a computing system of the autonomous vehicle, a topological tree by adding a plurality of nodes to represent a plurality of actions associated with the plurality of constraints, wherein expanding the topological tree comprises: generating, by the computing system, a bound based on a constraint of the plurality of constraints associated with traversing the roadway in the geographic area, the bound associated with an action for navigating the autonomous vehicle relative to the constraint; storing, by the computing system, the bound in a central bound storage of the autonomous vehicle; and linking, by the computing system, a set of bounds of a tree node to the bound stored in the central bound storage via a bound identifier, wherein the bound is initially linked as an active bound, or alternatively, as an inactive bound after determining it is not the most restrictive bound at any sample index; and controlling, by the computing system, the autonomous vehicle based on the topological tree, to navigate the plurality of constraints.

In some non-limiting embodiments or aspects, the computer-implemented method further includes that the bound includes at least one of a longitudinal bound or a lateral bound and generating bounds further comprises: generating a sample index interval to ensure efficient memory usage by reducing a number of bound comparisons, wherein the sample index interval corresponds to one of time interval for longitudinal bounds or a spatial interval along a reference path for lateral bounds.

In some non-limiting embodiments or aspects, the computer-implemented method may further include generating a plurality of candidate constraint sets that specify semantic longitudinal actions or lateral actions for all constraint choices, the plurality of candidate constraint sets including one or more bounds for determining the action of at least one of stop at stop line, pass object on right, pass object on left, yield behind, or track ahead; determining a trajectory by optimizing a semantic action associated with the candidate constraint set of the plurality of candidate sets, wherein determining the trajectory further comprises determining and scoring the trajectory based on the constraints of the candidate constraint set, the candidate constraint set based on a plurality of tree nodes connected together in the topological tree, the plurality of nodes including the one or more bounds satisfying the constraints, and the trajectory comprising a feasible trajectory; and selecting and initiating the trajectory.

In some non-limiting embodiments or aspects, the computer-implemented method may further include pruning one or more nodes from the topological tree, wherein the pruning includes at least one of a) feasibility pruning, b) strict redundancy pruning, or c) fuzzy redundancy pruning, to eliminate at least one node, for determining a trajectory to navigate one or more constraints along the geographic area of the roadway being traversed by the autonomous vehicle where 1) the at least one node is pruned as infeasible when it can be determined that a resultant trajectory cannot be feasible given the dynamic limitations of the vehicle, or 2) the at least one node is pruned as redundant when the resultant trajectory is determined to be similar to a trajectory of another node such that only one node can be considered.

In some non-limiting embodiments or aspects, the computer-implemented method may further include at least one of: a) pruning the bound based on feasibility, comprising: comparing the bound against a plurality of opposing active bounds, wherein the bound is either a minimum bound and the opposing bounds are maximum bounds, or the bound is a maximum bound and the opposing bounds are minimum bounds; determining an overlap between a sample index interval of the bound and a sample index interval of at least one of the plurality of active bounds on the opposite side; and pruning, from the topological tree, the tree node associated with the bound based on infeasibility when the bound distance of the bound and a bound distance of the opposite bound violate each other by a feasibility tolerance threshold at any overlapping sample index; b) pruning a bound based on strict redundancy, comprising: identifying a redundant tree node by comparing a first plurality of active bounds in a first node and a second plurality of active bounds in a second node, wherein the tree node is redundant when the first node and the second node have identical active bound identifiers or one or more collapsed bounds are within a redundant tolerance threshold; and pruning the redundant tree node for redundancy from the topological tree; or c) pruning a bound based on fuzzy redundancy, comprising: generating and storing in the central bound storage, a collapsed minimum and maximum longitudinal distance associated with a greatest restrictive bound distance of the set of bounds of the tree node at each sample time/location; generating a plurality of tolerances at a plurality of sample indexes that increase as a distance of a sample increases between a distance of an initial sample of the plurality of sample indexes; comparing, for each of the plurality of tolerances, for each pair of tree nodes that are not pruned, when a number of tree nodes is above a threshold number of unpruned tree nodes, a collapsed minimum and maximum longitudinal bound against a tolerance of the plurality of tolerances at each sample index; and pruning a node found to be a least restrictive node when a bound distance associated with the node is within a tolerance of the plurality of tolerances at each sample index of the plurality of sample indexes.

In some non-limiting embodiments or aspects, the computer-implemented method further includes that fuzzy redundancy comprises further pruning a plurality of nodes while still maintaining a diverse set of trajectory options when an intractable number of nodes to expand remain after infeasible or strict redundant nodes have been removed.

In some non-limiting embodiments or aspects, the computer-implemented method further includes that a sample index interval maps to one or more times sampled along a reference path to the first bound for a longitudinal bound, or alternatively, a sample index interval maps to one or more longitudinal distances sampled along a reference path for a lateral bound.

In some non-limiting embodiments or aspects, the computer-implemented method further includes that bounds with non-overlapping sample index intervals can be ignored as feasible or non-redundant when checking bounds against each other.

In some non-limiting embodiments or aspects, the computer-implemented method may further include restricting a search domain when determining bound redundancy and bound feasibility by limiting a search for one or more bounds to a bound found to be associated with a current sample index interval and limiting the search for the one or more bounds to only active sets of bounds of the tree node.

In some non-limiting embodiments or aspects, the computer-implemented method wherein bound attributes are not stored and copied into each tree node, and further wherein an inactive bound can be ignored when determining feasibility pruning and redundancy pruning.

In some non-limiting embodiments or aspects, the computer-implemented method may further include generating a plurality of collapsed bounds to provide an efficient implementation of fuzzy redundancy pruning and obtain a plurality of diverse constraint sets, wherein the plurality of collapsed bounds are determined throughout the topological tree for each tree node, and include a most restrictive distance at each sample index.

In some non-limiting embodiments or aspects, the computer-implemented method may further include determining a candidate constraint set based on a plurality of connected nodes in the topological tree that satisfy one or more constraints with respect to one of the plurality of constraints and provide a feasible trajectory with respect to lateral limits, longitudinal limits, or dynamic limits of the autonomous vehicle.

According to non-limiting embodiments or aspects, provided is an autonomous vehicle comprising one or more sensors; and a computing system comprising one or more processors, wherein the computing system is programmed and/or configured to: receive map data and sensor data associated with a plurality of constraints in a geographic area of the autonomous vehicle; expand a topological tree by adding a plurality of nodes to represent a plurality of actions associated with the plurality of constraints, wherein expanding the topological tree comprises: generate a bound based on a constraint of the plurality of constraints associated with traversing the roadway in the geographic area, the bound associated with an action for navigating the autonomous vehicle relative to the constraint; store the bound in a central bound storage of the autonomous vehicle; and link a set of bounds of a tree node to the bound stored in the central bound storage via a bound identifier, wherein the bound is initially linked as an active bound, or alternatively, as an inactive bound after determining it is not the most restrictive bound at any sample index; and control the autonomous vehicle based on the topological tree, to navigate the plurality of constraints.

In some non-limiting embodiments or aspects, the autonomous vehicle may further include that the bound includes at least one of a longitudinal bound or a lateral bound and generating bounds further comprises: generating a sample index interval to ensure efficient memory usage by reducing a number of bound comparisons, wherein the sample index interval corresponds to one of a time interval for longitudinal bounds or a spatial interval along a reference path for lateral bounds.

In some non-limiting embodiments or aspects, the autonomous vehicle may further include that the one or more processors are further programmed and/or configured to: prune one or more nodes from the topological tree, wherein the pruning includes at least one of a) feasibility pruning, b)

strict redundancy pruning, or c) fuzzy redundancy pruning, to eliminate at least one node, for determining a trajectory to navigate one or more constraints along the geographic area of the roadway being traversed by the autonomous vehicle where 1) the at least one node is pruned as infeasible when it can be determined that a resultant trajectory cannot be feasible given the dynamic limitations of the vehicle, or 2) the at least one node is pruned as redundant when the resultant trajectory is determined to be similar to a trajectory of another node such that only one node can be considered.

In some non-limiting embodiments or aspects, the autonomous vehicle may further include that the one or more processors are further programmed and/or configured to prune the topological tree by at least one of: a) prune a bound based on feasibility, comprising: comparing the bound against a plurality of opposing active bounds, wherein the bound is either a minimum bound and the opposing bounds are maximum bounds, or the bound is a maximum bound and the opposing bounds are minimum bounds; determining an overlap between a sample index interval of the bound and a sample index interval of at least one of the plurality of active bounds on the opposite side; and pruning, from the topological tree, the tree node associated with the bound based on infeasibility when the bound distance of the bound and a bound distance of the opposite bound violate each other by a feasibility tolerance threshold at any overlapping sample index; b) prune a bound based on strict redundancy, comprising: identifying a redundant tree node by comparing a first plurality of active bounds in a first node and a second plurality of active bounds in a second node, wherein the tree node is redundant when the first node and the second node have identical active bound identifiers or one or more collapsed bounds are within a redundant tolerance threshold; and pruning the redundant tree node for redundancy from the topological tree; or c) prune a bound based on fuzzy redundancy, comprising: generating and storing in the central bound storage, a collapsed minimum and maximum longitudinal distance associated with a greatest restrictive bound distance of the set of bounds of the tree node at each sample time/location; generating a plurality of tolerances at a plurality of sample indexes that increase as a distance of a sample increases between a distance of an initial sample of the plurality of sample indexes; comparing, for each of the plurality of tolerances, for each pair of tree nodes that are not pruned, when a number of tree nodes is above a threshold number of unpruned tree nodes, a collapsed minimum and maximum longitudinal bound against a tolerance of the plurality of tolerances at each sample index; and pruning a node found to be a least restrictive node when a bound distance associated with the node is within a tolerance of the plurality of tolerances at each sample index of the plurality of sample indexes.

In some non-limiting embodiments or aspects, the autonomous vehicle may further include fuzzy redundancy wherein fuzzy redundancy comprises further pruning a plurality of nodes while still maintaining a diverse set of trajectory options when an intractable number of nodes to expand remain after infeasible or strict redundant nodes have been removed.

In some non-limiting embodiments or aspects, the autonomous vehicle may further include that a sample index interval maps to one or more times sampled along a reference path to the first bound for a longitudinal bound, or alternatively, a sample index interval maps to one or more longitudinal distances sampled along a reference path for a lateral bound.

In some non-limiting embodiments or aspects, the autonomous vehicle may further include that the one or more processors are further programmed and/or configured to restrict a search domain when determining bound redundancy and bound feasibility by limiting a search for one or more bounds to a bound found to be associated with a current sample index interval and limiting the search for the one or more bounds to only active sets of bounds of the tree node.

According to non-limiting embodiments or aspects, provided is a computer program product for secure key management comprising at least one non-transitory computer-readable medium including one or more instructions that, when executed by at least one processor, cause the at least one processor to: receive map data and sensor data associated with a plurality of constraints in a geographic area of the autonomous vehicle; expand a topological tree by adding a plurality of nodes to represent a plurality of actions associated with the plurality of constraints, wherein expanding the topological tree comprises: generate a bound based on a constraint of the plurality of constraints associated with traversing the roadway in the geographic area, the bound associated with an action for navigating the autonomous vehicle relative to the constraint; store the bound in a central bound storage of the autonomous vehicle; and link a set of bounds of a tree node to the bound stored in the central bound storage via a bound identifier, wherein the bound is initially linked as an active bound, or alternatively, as an inactive bound after determining it is not the most restrictive bound at any sample index; and control the autonomous vehicle based on the topological tree, to navigate the plurality of constraints.

Further non-limiting embodiments or aspects are set forth in the following numbered clauses:

Clause 1: A computer-implemented method of maneuvering an autonomous vehicle traversing a route on a roadway, comprising: receiving, by the autonomous vehicle, map data and sensor data associated with a plurality of constraints in a geographic area of the autonomous vehicle; expanding, by a computing system of the autonomous vehicle, a topological tree by adding a plurality of nodes to represent a plurality of actions associated with the plurality of constraints, wherein expanding the topological tree comprises: generating, by the computing system, a bound based on a constraint of the plurality of constraints associated with traversing the roadway in the geographic area, the bound associated with an action for navigating the autonomous vehicle relative to the constraint; storing, by the computing system, the bound in a central bound storage of the autonomous vehicle; and linking, by the computing system, a set of bounds of a tree node to the bound stored in the central bound storage via a bound identifier, wherein the bound is initially linked as an active bound, or alternatively, as an inactive bound after determining it is not the most restrictive bound at any sample index; and controlling, by the computing system, the autonomous vehicle based on the topological tree, to navigate the plurality of constraints.

Clause 2: The computer-implemented method of clause 1, wherein the bound includes at least one of a longitudinal bound or a lateral bound and generating bounds further comprises: generating a sample index interval to ensure efficient memory usage by reducing a number of bound comparisons, wherein the sample index interval corresponds to one of time interval for longitudinal bounds or a spatial interval along a reference path for lateral bounds.

Clause 3: The computer-implemented method of clauses 1 or 2, further comprising: generating a plurality of candidate constraint sets that specify semantic longitudinal actions or lateral actions for all constraint choices, the plurality of candidate constraint sets including one or more bounds for determining the action of at least one of stop at stop line, pass object on right, pass object on left, yield behind, or track ahead; determining a trajectory by optimizing a semantic action associated with the candidate constraint set of the plurality of candidate sets, wherein determining the trajectory further comprises determining and scoring the trajectory based on the constraints of the candidate constraint set, the candidate constraint set based on a plurality of tree nodes connected together in the topological tree, the plurality of nodes including the one or more bounds satisfying the constraints, and the trajectory comprising a feasible trajectory; and selecting and initiating the trajectory.

Clause 4: The computer-implemented method of clauses 1-3, further comprising, pruning one or more nodes from the topological tree, wherein the pruning includes at least one of a) feasibility pruning, b) strict redundancy pruning, or c) fuzzy redundancy pruning, to eliminate at least one node, for determining a trajectory to navigate one or more constraints along the geographic area of the roadway being traversed by the autonomous vehicle where 1) the at least one node is pruned as infeasible when it can be determined that a resultant trajectory cannot be feasible given the dynamic limitations of the vehicle, or 2) the at least one node is pruned as redundant when the resultant trajectory is determined to be similar to a trajectory of another node such that only one node can be considered.

Clause 5: The computer-implemented method of clauses 1-4, further comprising at least one of: a) pruning the bound based on feasibility, comprising: comparing the bound against a plurality of opposing active bounds, wherein the bound is either a minimum bound and the opposing bounds are maximum bounds, or the bound is a maximum bound and the opposing bounds are minimum bounds; determining an overlap between a sample index interval of the bound and a sample index interval of at least one of the plurality of active bounds on the opposite side; and pruning, from the topological tree, the tree node associated with the bound based on infeasibility when the bound distance of the bound and a bound distance of the opposite bound violate each other by a feasibility tolerance threshold at any overlapping sample index; b) pruning a bound based on strict redundancy, comprising: identifying a redundant tree node by comparing a first plurality of active bounds in a first node and a second plurality of active bounds in a second node, wherein the tree node is redundant when the first node and the second node have identical active bound identifiers or one or more collapsed bounds are within a redundant tolerance threshold; and pruning the redundant tree node for redundancy from the topological tree; or c) pruning a bound based on fuzzy redundancy, comprising: generating and storing in the central bound storage, a collapsed minimum and maximum longitudinal distance associated with a greatest restrictive bound distance of the set of bounds of the tree node at each sample time/location; generating a plurality of tolerances at a plurality of sample indexes that increase as a distance of a sample increases between a distance of an initial sample of the plurality of sample indexes; comparing, for each of the plurality of tolerances, for each pair of tree nodes that are not pruned, when a number of tree nodes is above a threshold number of unpruned tree nodes, both of a collapsed minimum and maximum longitudinal bound with a tolerance of each sample index; and pruning a node found to be a least restrictive node when a bound distance associated with the node is within a tolerance of the plurality of tolerances at each sample index of the plurality of sample indexes.

Clause 6: The computer-implemented method of clauses 1-5, wherein fuzzy redundancy comprises further pruning a plurality of nodes while still maintaining a diverse set of trajectory options when an intractable number of nodes to expand remain after infeasible or strict redundant nodes have been removed.

Clause 7: The computer-implemented method of clauses 1-6, wherein a sample index interval maps to one or more times sampled along a reference path to the first bound for a longitudinal bound, or alternatively, a sample index interval maps to one or more longitudinal distances sampled along a reference path for a lateral bound.

Clause 8: The computer-implemented method of clauses 1-7, wherein bounds with non-overlapping sample index intervals can be ignored as feasible or non-redundant when checking bounds against each other.

Clause 9: The computer-implemented method of clauses 1-8, further comprising: restricting a search domain when determining bound redundancy and bound feasibility by limiting a search for one or more bounds to a bound found to be associated with a current sample index interval and limiting the search for the one or more bounds to only active sets of bounds of the tree node.

Clause 10: The computer-implemented method of clauses 1-9, wherein bound attributes are not stored and copied into each tree node, and further wherein an inactive bound can be ignored when determining feasibility pruning and redundancy pruning.

Clause 11: The computer-implemented method of clauses 1-10, further comprising: generating a plurality of collapsed bounds to provide an efficient implementation of fuzzy redundancy pruning and obtain a plurality of diverse constraint sets, wherein the plurality of collapsed bounds are determined throughout the topological tree for each tree node, and include a most restrictive distance at each sample index.

Clause 12: The computer-implemented method of clauses 1-11, further comprising: determining a candidate constraint set based on a plurality of connected nodes in the topological tree that satisfy one or more constraints with respect to one of the plurality of constraints and provide a feasible trajectory with respect to lateral limits, longitudinal limits, or dynamic limits of the autonomous vehicle.

Clause 13: An autonomous vehicle, comprising: one or more sensors; and a computing system comprising one or more processors, wherein the computing system is programmed and/or configured to: receive map data and sensor data associated with a plurality of constraints in a geographic area of the autonomous vehicle; expand a topological tree by adding a plurality of nodes to represent a plurality of actions associated with the plurality of constraints, wherein expanding the topological tree comprises: generate a bound based on a constraint of the plurality of constraints associated with traversing the roadway in the geographic area, the bound associated with an action for navigating the autonomous vehicle relative to the constraint; store the bound in a central bound storage of the autonomous vehicle; and link a set of bounds of a tree node to the bound stored in the central bound storage via a bound identifier, wherein the bound is initially linked as an active bound, or alternatively, as an inactive bound after determining it is not the most restrictive bound at any sample index; and control the autonomous vehicle based on the topological tree, to navigate the plurality of constraints.

Clause 14: The autonomous vehicle of clause 13, wherein the bound includes at least one of a longitudinal bound or a lateral bound and generating bounds further comprises: generating a sample index interval to ensure efficient memory usage by reducing a number of bound comparisons, wherein the sample index interval corresponds to one of a time interval for longitudinal bounds or a spatial interval along a reference path for lateral bounds.

Clause 15: The autonomous vehicle of clauses 13 or 14, wherein the one or more processors are further programmed and/or configured to: prune one or more nodes from the topological tree, wherein the pruning includes at least one of a) feasibility pruning, b) strict redundancy pruning, or c) fuzzy redundancy pruning, to eliminate at least one node, for determining a trajectory to navigate one or more constraints along the geographic area of the roadway being traversed by the autonomous vehicle where 1) the at least one node is pruned as infeasible when it can be determined that a resultant trajectory cannot be feasible given the dynamic limitations of the vehicle, or 2) the at least one node is pruned as redundant when the resultant trajectory is determined to be similar to a trajectory of another node such that only one node can be considered.

Clause 16: The autonomous vehicle of clauses 13-15, wherein the one or more processors are further programmed and/or configured to prune the topological tree by at least one of: a) prune a bound based on feasibility, comprising: comparing the bound against a plurality of opposing active bounds, wherein the bound is either a minimum bound and the opposing bounds are maximum bounds, or the bound is a maximum bound and the opposing bounds are minimum bounds; determining an overlap between a sample index interval of the bound and a sample index interval of at least one of the plurality of active bounds on the opposite side; and pruning, from the topological tree, the tree node associated with the bound based on infeasibility when the bound distance of the bound and a bound distance of the opposite bound violate each other by a feasibility tolerance threshold at any overlapping sample index; b) prune a bound based on strict redundancy, comprising, identifying a redundant tree node by comparing a first plurality of active bounds in a first node and a second plurality of active bounds in a second node, wherein the tree node is redundant when the first node and the second node have identical active bound identifiers or one or more collapsed bounds are within a redundant tolerance threshold; pruning the redundant tree node for redundancy from the topological tree; or c) prune a bound based on fuzzy redundancy, comprising: generating and storing in the central bound storage, a collapsed minimum and maximum longitudinal distance associated with a greatest restrictive bound distance of the set of bounds of the tree node at each sample time/location; generating a plurality of tolerances at a plurality of sample indexes that increase as a distance of a sample increases between a distance of an initial sample of the plurality of sample indexes; comparing, for each of the plurality of tolerances, for each pair of tree nodes that are not pruned, when a number of tree nodes is above a threshold number of unpruned tree nodes, both of a collapsed minimum and maximum longitudinal bound with a tolerance of each sample index; and pruning a node found to be a least restrictive node when a bound distance associated with the node is within a tolerance of the plurality of tolerances at each sample index of the plurality of sample indexes.

Clause 17: The autonomous vehicle of clauses 13-16, wherein fuzzy redundancy comprises further pruning a plurality of nodes while still maintaining a diverse set of trajectory options when an intractable number of nodes to expand remain after infeasible or strict redundant nodes have been removed.

Clause 18: The autonomous vehicle of clauses 13-17, wherein a sample index interval maps to one or more times sampled along a reference path to the first bound for a longitudinal bound, or alternatively, a sample index interval maps to one or more longitudinal distances sampled along a reference path for a lateral bound.

Clause 19: The autonomous vehicle of clauses 13-18, wherein the one or more processors are further programmed and/or configured to restrict a search domain when determining bound redundancy and bound feasibility by limiting a search for one or more bounds to a bound found to be associated with a current sample index interval and limiting the search for the one or more bounds to only active sets of bounds of the tree node.

Clause 20: A computer program product for topological planning with bounds representation, comprising at least one non-transitory computer-readable medium including one or more instructions that, when executed by at least one processor, cause the one or more processors to: receive map data and sensor data associated with a plurality of constraints in a geographic area of the autonomous vehicle; expand a topological tree by adding a plurality of nodes to represent a plurality of actions associated with the plurality of constraints; generate a bound based on a constraint of the plurality of constraints associated with traversing the roadway in the geographic area, the bound associated with an action for navigating the autonomous vehicle relative to the constraint; store the bound in a central bound storage of the autonomous vehicle; and link a set of bounds of a tree node to the bound stored in the central bound storage via a bound identifier, wherein the bound is initially linked as an active bound, or alternatively, as an inactive bound after determining it is not the most restrictive bound at any sample index; and control the autonomous vehicle based on the topological tree, to navigate the plurality of constraints.

These and other features and characteristics of the present disclosure, as well as, the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure.

BRIEF DESCRIPTION OF THE DRAWINGS

Additional advantages and details of the present disclosure are explained in greater detail below with reference to the exemplary embodiments that are illustrated in the accompanying schematic figures, in which.

DETAILED DESCRIPTION

Figure 1A:
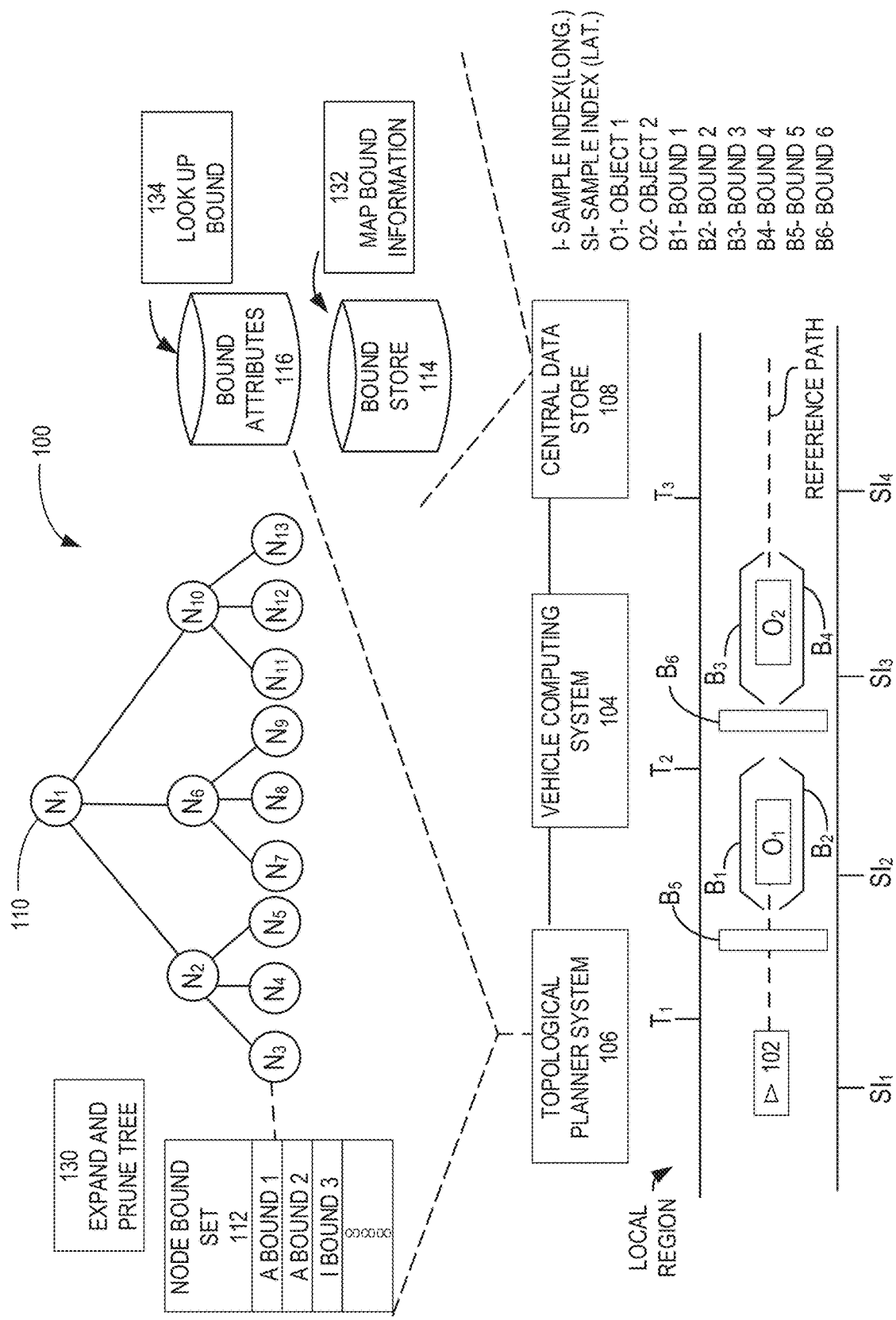
FIGS. 1A-1B are diagrams of non-limiting embodiments or aspects of a topological planning environment in which systems, apparatuses, and/or methods, as described herein, may be implemented.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects of the embodiments or aspects disclosed herein are not to be considered as limiting unless otherwise indicated. In addition, terms of relative position such as "vertical" and "horizontal", or "front" and "rear", when used, are intended to be relative to each other and need not be absolute, and only refer to one possible position of the device associated with those terms depending on the device's orientation.

No aspect, component, element, structure, act, step, function, instruction, and/or the like used herein should be construed as critical or essential unless explicitly described as such. Also, as used herein, the articles "a" and "an" are intended to include one or more items, and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise. Additionally, when terms such "first" and "second" are used to modify a noun, such use is simply intended to distinguish one item from another, and is not intended to require a sequential order unless specifically stated.

In some non-limiting embodiments or aspects, one or more aspects of a topological tree expansion are described herein, in connection with thresholds (e.g., a tolerance, a tolerance threshold, etc.). As used herein, satisfying a threshold may refer to a value (e.g., a score, an objective score, etc.) being greater than the threshold, more than the threshold, higher than the threshold, greater than or equal to the threshold, less than the threshold, fewer than the threshold, lower than the threshold, less than or equal to the threshold, equal to the threshold, etc.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively send information to the second unit. As another example, a first unit may be in communication with a second unit if at least one intermediary unit (e.g., a third unit located between the first unit and the second unit) processes information received from the first unit and sends the processed information to the second unit. In some non-limiting embodiments or aspects, a message may refer to a network packet (e.g., a data packet and/or the like) that includes data.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be included in a device onboard an autonomous vehicle (AV). As an example, a computing device may include an onboard specialized computer (e.g., a sensor, a controller, a data store, a communication interface, a display interface, etc.), a mobile device (e.g., a smartphone, standard cellular phone, or integrated cellular device,), a portable computer, a wearable device (e.g., watches, glasses, lenses, clothing, and/or the like), a personal digital assistant (PDA), and/or other like devices. A computing device may also be a desktop computer or other form of non-mobile computer.

As used herein, the terms "client" and "client device" may refer to one or more computing devices that access a service made available by a server. In some non-limiting embodiments or aspects, a "client device" may refer to one or more devices that facilitate a maneuver by an AV, such as one or more remote devices communicating with an AV. In some non-limiting embodiments or aspects, a client device may include a computing device configured to communicate with one or more networks and/or facilitate vehicle movement such as, but not limited to, one or more vehicle computers, one or more mobile devices, and/or other like devices.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, data stores, controllers, communication interfaces, mobile devices, and/or the like) directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "system" may refer to one or more computing devices or combinations of computing devices such as, but not limited to, processors, servers, client devices, software applications, and/or other like components. In addition, reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "data store," "data storage facility," and the like each refer to a non-transitory device on which computer-readable data, programming instructions, or both are stored. Except where specifically stated otherwise, the terms "memory," "memory device," "data store," "data storage facility," and the like are intended to include single device embodiments, embodiments in which multiple memory devices together or collectively store a set of data or instructions, as well as, individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones, and the like. An "autonomous vehicle" (AV) is a vehicle having a processor, programming instructions and drivetrain components that are controllable by the processor without requiring a human operator. An AV may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle. The AV can be a ground-based AV (e.g., car, truck, bus, etc.), an air-based AV (e.g., airplane, drone, helicopter, or other aircraft), or other types of vehicles (e.g., watercraft).

As used herein, the terms "trajectory" and "trajectories" may refer to a path (e.g., a path through a geospatial area, etc.) with positions of the AV along the path with respect to time, where a "path" generally implies a lack of temporal information, one or more paths for navigating an AV in a roadway for controlling travel of the AV on the roadway. A trajectory may be associated with a map of a geographic location including the roadway. In such an example, the path may traverse a roadway, an intersection, or other connection, or link of the road with another road, a lane of the roadway, objects in proximity to and/or within the road, and/or the like. For example, a trajectory may define a path of travel on a roadway for an AV that follows each of the rules (e.g., the path of travel does not cross a yellow line, etc.) associated with the roadway. In such an example, an AV that travels over or follows the trajectory (e.g., that travels on the roadway without deviating from the trajectory, etc.) may obey each of the rules or account for constraints (e.g., objects in the roadway, does not cross the yellow line, etc.) associated with the roadway.

As used herein, "map data" includes data associated with a road (e.g., an identity and/or a location of a roadway of a road, an identity and/or location of a segment of a road, etc.), data associated with an object in proximity to a road (e.g., a building, a lamppost, a crosswalk, a curb of the road, etc.), data associated with a lane of a roadway (e.g., the location and/or direction of a travel lane, a parking lane, a turning lane, a bicycle lane, etc.), data associated with traffic control of a road (e.g., the location of and/or instructions associated with lane markings, traffic signs, traffic lights, etc.), and/or the like. According to some embodiments, a map of a geographic location includes one or more routes (e.g. nominal route, driving route, etc.) that include one or more roadways. According to some non-limiting embodiments or aspects, map data associated with a map of the geographic location associates the one or more roadways with an indication of whether an AV can travel on that roadway.

As used herein, a "road" refers to a paved or otherwise improved path between two places that allows for travel by a vehicle (e.g., autonomous vehicle 102). Additionally or alternatively, a road includes a roadway and a sidewalk in proximity to (e.g., adjacent, near, next to, touching, etc.) the roadway. In some non-limiting embodiments or aspects, a roadway includes a portion of a road on which a vehicle is intended to travel and is not restricted by a physical barrier or by separation so that the vehicle is able to travel laterally. Additionally or alternatively, a roadway (e.g., a road network, one or more roadway segments, etc.) includes one or more lanes in which a vehicle may operate, such as, a travel lane (e.g., a lane upon which a vehicle travels, a traffic lane, etc.), a parking lane (e.g., a lane in which a vehicle parks), a turning lane (e.g., a lane in which a vehicle turns from), and/or the like. Additionally or alternatively, a roadway includes one or more lanes in which a pedestrian, bicycle or other vehicle may travel, such as, a crosswalk, a bicycle lane (e.g., a lane in which a bicycle travels), a mass transit lane (e.g. a lane in which a bus may travel), and/or the like. According to some non-limiting embodiments, a roadway is connected to another roadway to form a road network, for example, a lane of a roadway is connected to another lane of the roadway and/or a lane of the roadway is connected to a lane of another roadway. In some non-limiting embodiments, an attribute of a roadway includes a road edge of a road (e.g., a location of a road edge of a road, a distance of location from a road edge of a road, an indication whether a location is within a road edge of a road, etc.), an intersection, connection, or link of a road with another road, a roadway of a road, a distance of a roadway from another roadway (e.g., a distance of an end of a lane and/or a roadway segment or extent to an end of another lane and/or an end of another roadway segment or extent, etc.), a lane of a roadway of a road (e.g., a travel lane of a roadway, a parking lane of a roadway, a turning lane of a roadway, lane markings, a direction of travel in a lane of a roadway, etc.), one or more objects (e.g., a vehicle, vegetation, a pedestrian, a structure, a building, a sign, a lamppost, signage, a traffic sign, a bicycle, a railway track, a hazardous object, etc.) in proximity to and/or within a road (e.g., objects in proximity to the road edges of a road and/or within the road edges of a road), a sidewalk of a road, and/or the like.

As used herein, navigating (e.g., traversing, driving, etc.) a route may involve the creation of at least one trajectory or path through the road network, and may include an evaluation of any number of maneuvers (e.g., a simple maneuver, a complex maneuver, etc.), such as a maneuver involving certain driving conditions, such as dense traffic, where successfully completing a lane change may require a complex maneuver, like speeding up, slowing down, stopping, or abruptly turning, for example, to steer into a narrow gap between vehicles (or other objects as detailed herein) in a destination lane. Additionally, in-lane maneuvers may also involve an evaluation of any number of maneuvers, such as a maneuver to traverse a lane split, an intersection (e.g., a three-leg, a four-leg, a multileg, a roundabout, a T-junction, a Y-intersection, a traffic circle, a fork, turning lanes, a split intersection, a town center intersection, etc.), a travel lane (e.g., a lane upon which a vehicle travels, a traffic lane, etc.), a parking lane (e.g., a lane in which a vehicle parks), a turning lane (e.g., a lane from which a vehicle turns, etc.), merging lanes (e.g., two lanes merging to one lane, one lane ends and merges into a new lane to continue, etc.), and/or the like. Maneuvers may also be based on current traffic conditions that may involve an evaluation of any number of maneuvers, such as a maneuver based on a current traffic speed of objects in the roadway, current accidents or other incidents in the roadway, weather conditions in the geographic area (e.g., rain, fog, hail, sleet, ice, snow, etc.), or road construction projects. In addition, maneuvers may also involve an evaluation of any number of objects in and around the roadway, such as a maneuver to avoid an objects in proximity to a road, such as structures (e.g., a building, a rest stop, a toll booth, a bridge, etc.), traffic control objects (e.g., lane markings, traffic signs, traffic lights, lampposts, curbs of the road, gully, a pipeline, an aqueduct, a speed-bump, a speed depression, etc.), a lane of a roadway (e.g., a parking lane, a turning lane, a bicycle lane, etc.), a crosswalk, a bicycle lane (e.g., a lane in which a bicycle travels), a mass transit lane (e.g. a travel lane in which a bus, a train, a light rail, and/or the like may travel), objects in proximity to and/or within a road (e.g., a parked vehicle, a double parked vehicle, vegetation, a lamppost, signage, a traffic sign, a bicycle, a railway track, a hazardous object, etc.), a sidewalk of a road, and/or the like.

As used herein, "sensor data" includes data from one or more sensors. For example, sensor data may include light detection and ranging (LiDAR) point cloud maps (e.g., map point data, etc.) associated with a geographic location (e.g., a location in three-dimensional space relative to the LiDAR system of a mapping vehicle) of a number of points (e.g., a point cloud) that correspond to objects that have reflected a ranging laser of one or more mapping vehicles at the geographic location. As an example, sensor data may include LiDAR point cloud data that represents objects in the roadway, such as other vehicles, pedestrians, cones, debris, etc.

A vehicle computing system 104 can control an autonomous vehicle 102 on a trajectory (e.g., a path) as it traverses a roadway or traverses between roadways (e.g., a lateral transition from a first roadway to a second roadway, a linear transition from a first roadway to a second roadway, a merger from a first roadway into a second roadway, and/or the like). The appropriate trajectory can be affected by objects that are encountered by autonomous vehicle 102 along the route, such as other vehicles, pedestrians, signage, and the like. In some non-limiting embodiments, vehicle computing system 104 may employ topological planning techniques to navigate these objects. In such topological planning techniques, the objects and the actions available in response to such objects may be represented as a hierarchical architecture for generating trajectories for the autonomous vehicle 102. In some non-limiting embodiments, this process of trajectory planning can include generating sets of candidate constraints that specify semantic longitudinal and lateral actions (e.g. stop at stop line, pass object on right); optimizing a trajectory for each candidate constraint set where the trajectory satisfies the constraints and is feasible with respect to the dynamic limits of the autonomous vehicle 102; and selecting the best candidate trajectory for execution. An example of topological planning in autonomous vehicle driving is set forth in U.S. application Ser. No. 16/597,283, filed on Oct. 9, 2019, the disclosure of which is expressly incorporated herein by reference.

In existing systems, due to computational infeasibility, only a limited number of distinct constraint sets corresponding to unique sets of actions for each can be generated. For example, in a topological tree where every possible constraint set is represented, a tree node would be expanded for every exponential permutation of all actions across all constraints. Therefore, this system may generate and store in process memory, a copy of all bounds for each discrete action that can be taken for each constraint. In order to evaluate these bounds, expensive computations are made, as every bound may then be compared against every other bound from a different node at every time or location.

Therefore, a naive implementation of a topological tree node for traversing a road network would need to contain a copy of a bound for every constraint. As an example, the potential topological decisions for an object would at least include actions that involve yielding behind an object (e.g., a car, an object in the roadway, etc.), maintaining position in front of an object, passing the object on the left, passing the object on the right, and stopping the vehicle.

Making such topological decisions for an object will generally result in a subset of decisions for other objects becoming dynamically infeasible. For example, a naive implementation of a topological tree expansion is exponential in complexity (e.g., considering every combination of actions across a set of constraints), and therefore pruning steps are needed in order to limit the number of tree nodes to account for during a tree search. With an unwieldy and intractable number of candidate constraint sets being passed, existing systems may be unable to efficiently compute an optimal trajectory, even when pruning is used to determine potential constraint sets.

Existing systems may also include a number of structural drawbacks, such as, for example, excess memory allocation, even without any actions selected or any bounds populated, and dynamic memory allocation, required when the number of bounds exceeds a threshold number, which is common for crowded roadways.

When handling multiple nodes, duplicate data is often created to handle different nodes with at least one of the same actions. Existing systems may duplicate bounds for that action in each node. Even in situations where the bound distance is fixed (e.g., fixed bounds, etc.), such as for stop constraints, bounds are inefficiently stored with the same distance value along a roadway.

Additionally, the type of data structures used to implement such existing systems may be inefficient, and/or may not sufficiently account for duplicate data retrieval. In such systems, even though the data structure is conducive to retrieving bounds at one time/location at a time, it may not efficiently retrieve bounds to account for common constraints. Also, bound data may be limited to a constraint ID and a single distance value, and insufficient to express, for example, a bound type, a desired offset from the bound distance, a safety range to account for uncertainty or mover reaction, etc.

Such memory inefficiency of existing systems also affects runtime processing because nodes (and their associated bound data) are copied during tree expansion, even redundant bounds which require copying the same bounds numerous times. Such inefficiencies can affect debugging of such existing systems by making a full debug, including the nodes at every tree level, too costly.

Further, existing pruning algorithms may provide no real distinction between different types of bounds. For example, existing systems that do not directly indicate a bound type, may be indistinguishable for pruning algorithms. For example, when a same tolerance is used for determining infeasibility across multiple nodes or constraints, pruning may not sufficiently eliminate bounds when determining between actions for objects because uncertainty may not be eliminated and/or sufficiently handled by the same tolerance.

Thus, the inefficiencies of existing systems involve duplicated computation, such as when an update is made to the bounds for an action, as the system may be required to check or recheck bounds from other sample times and/or locations, even when only a small sample interval is being updated. Additionally, disjoint pruning is insufficient and may arise when pruning different bounds separately, such as, when a longitudinal bound is pruned without consideration for one or more associated lateral bounds.

Provided are improved systems, methods, and computer program products for expanding a topological tree and efficiently determining a set of candidate constraints for controlling an AV navigating a roadway. In some non-limiting embodiments or aspects, a system, such as a vehicle controller computing device, vehicle data storage, and topological planner may include at least one processor programmed or configured to, receive map data and sensor data associated with a plurality of constraints (e.g. a stop, an object, an intersection, etc.), in a geographic area of an AV traversing a route on a roadway, expand a topological tree by adding a plurality of nodes to represent a plurality of actions associated with the plurality of constraints, generate a new bound based on a constraint associated with at least one constraint of the plurality of constraints in the geographic area, the new bound including a bound identifier and associated with an action for navigating the AV relative to the at least one constraint, store the new bound in a central bound storage of the AV, link a set of bounds of a tree node to the new bound via the bound identifier, wherein the new bound is initially linked as an active bound, and in response to linking the set of bounds of the tree node to the new bound, determine the new bound is active when it is determined to be the most restrictive bound for the set of bounds of the tree node at a sample index, and determining the new bound is inactive when the new bound is never the most restrictive bound at any sample index, and control the AV based on the topological tree, to navigate the plurality of constraints. In some non-limiting embodiments or aspects, controlling the AV involves topological planning to generate multiple candidate constraint sets, each of the candidate constraint sets is used to optimize a candidate trajectory and one of the candidate constraint sets may be selected to control the AV by a trajectory scoring subsystem of a vehicle computing system, etc.).

According to the systems, methods, and computer program products described herein, a centralized bound storage can ensure copying tree nodes is trivial. The centralized bound storage can store bounds that are defined over a relevant sample index interval to ensure efficient memory usage, since each leaf node in the tree may only include longitudinal and lateral bounds based on a selected constraint set represented at the sample indices by a small flat set of bound values, such as, bound identifiers that refer back to bound information stored in the centralized bound storage and, in this way, ensuring that fewer (e.g., only one) bound is generated per constraint (or action) as opposed to generating bounds for each tree node.

Further, the topological tree node contains sets of active and inactive bound ids enabling efficient representation of the most restrictive constraints (e.g., the active bound ids, etc.). Such use of a sample index interval and active bound sets can be used to further restrict the search space (e.g., search domain, etc.) when determining redundancy and feasibility of bounds, and collapsed bounds are generated and stored to enable efficient implementation of inexact algorithms, such as fuzzy redundancy pruning, to more sufficiently eliminate redundant bounds. Furthermore, fuzzy redundancy pruning enables the planner to reduce the number of diverse constraint sets when feasibility and strict redundancy pruning is insufficient. For example, fuzzy redundancy pruning allowing additional pruning, also reduces the number of diverse constraint sets when feasibility and strict redundancy pruning are insufficient to prune down to a tractable number of constraint sets.

In addition, the topological planner may use data structures as described herein to more efficiently expand a tree of topological decisions with respect to constraints in the AV's environment. For example, as successive decisions are made, the planner may leverage such data structures to efficiently update a representation of the environment, such as by using topological bounds as a means to more sufficiently determine the feasibility of choosing various permutations of topological decisions. The data structures defined herein may facilitate efficient implementations of the topological expansion and pruning steps based on storing bounds universally, in a centralized bound storage to ensure copying tree nodes is trivial, to ensure bounds are defined over a relevant sample index interval to provide more efficient memory usage, to maintain an active set of bounds that enables efficient representation of the most restrictive constraints, to use the sample index interval and active bound sets to restrict the search domain, to more efficiently prune using collapsed bounds that eliminate less obvious redundant bounds, and maintain only those bounds that provide unique and feasible actions for navigating objects in a roadway.

Figure 1B:
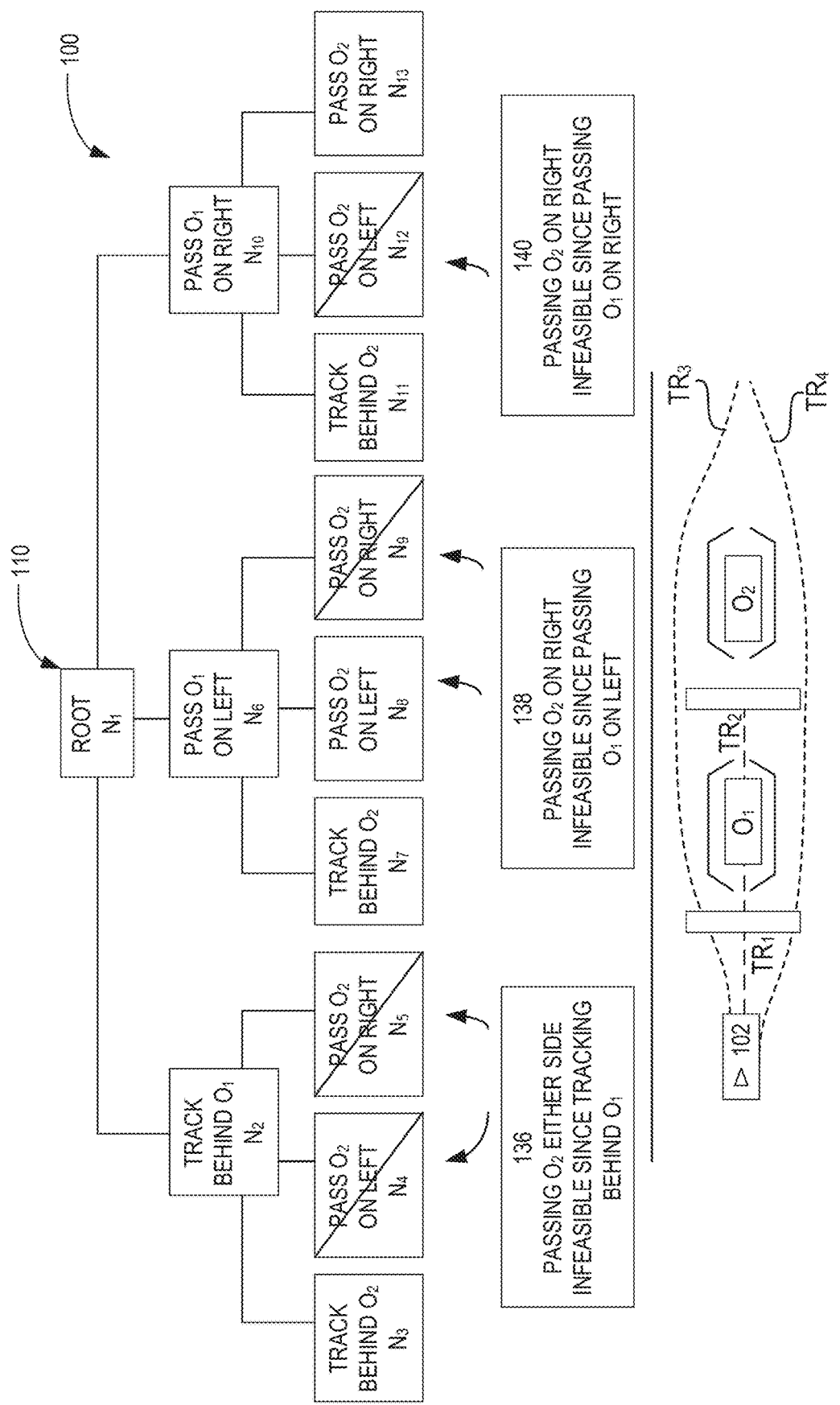

Referring now to FIGS. 1A-1B, provided is an example environment 100 in which devices, systems, and/or methods, described herein, may be implemented. Environment 100 can include autonomous vehicle 102, vehicle computing system 104, topological planner system 106, where the bound data is stored in a central data store 108, apart from the nodes (N) in a topological tree 110. In some examples, vehicle computing system 104 and topological planner system 106 may interconnect (e.g., establish a connection to communicate and/or the like) via wired connections and/or wireless connections with vehicle computing system 104. In such an example, the topological planner system 106 may include or contain the centralized bound store 108 and the topological planner system 106 may include one or more processors programmed or configured to perform topological planning while executing or running on the vehicle computing system 104.

In some non-limiting embodiments or aspects, vehicle computing system 104 and/or topological planner system 106 include programming 130 capable of expanding and pruning the topological tree 110 based on, for example, map data and sensor data. Vehicle computing system 104 and/or topological planner system 106 may further include programming capable of generating, storing, communicating, linking, comparing, updating, removing, or determining one or more topologically distinct classes in the local region based on an analysis of map data and sensor data received real-time in autonomous vehicle 102. Each topologically distinct class associated with a set of trajectories can take the same discrete actions with respect to objects in the local region. For example, as shown in FIG. 1A, traveling a local region between the current position of autonomous vehicle 102 and a destination (e.g., a location when the autonomous vehicle 102 will exit the local region, etc.), autonomous vehicle 102 will need to avoid the objects $O_1$, $O_2$. Vehicle computing system 104 (e.g. one or more processors of vehicle computing system 104, topological planner system 106, central data store 108, etc.) generates the topologically distinct classes by analyzing the spatial relationships the autonomous vehicle 102 can have with respect to the objects $O_1$, $O_2$, and with respect to a reference path. For the example shown in FIG. 1A, autonomous vehicle 102 may yield to objects $O_1$, $O_2$ by tracking behind an object (e.g., yielding to a longitudinal bound), or by passing an object either on a left side or on a right side (e.g., yielding to a lateral bound). While depicted in FIG. 1A as separate and different components, vehicle computing system 104, topological planning system 106, and central data store 108 in some non-limiting embodiments, may all be part of the same computing system, such as the computing system of an autonomous vehicle 102.

Vehicle computing system 104 and/or topological planner system 106 includes one or more devices capable of generating, storing, communicating, linking, comparing, updating, or removing a set of bounds that are relevant to each node of topological tree 110. For example, topological planner system 106 can determine node bound set 112 that includes a set of active bound identifiers and inactive bound identifiers representing actions for avoiding a constraint at a particular sample index. Node bound set 112 may include a combination of bounds that are only relevant to a particular location in the roadway represented by the particular node of topological tree 110.

In some non-limiting embodiments or aspects, node bound set 112 provides one or more bound identifiers that are defined at a sample index in the local region. In some non-limiting embodiments or aspects, provided are at least two active bounds and any number of inactive bounds, the active bounds of node bound set 112 are deemed to represent the most restrictive bounds when compared to any other bound in node bound set 112 (e.g., the bound node set particular to that node at that sample index), including a most restrictive minimum bound and a most restrictive maximum bound (e.g., a min bound, a max bound, etc.). Node bound set 112 also includes inactive bound identifiers, defined as bounds which at all sample indices are less restrictive than any other active bound. In some examples, one or more other system components of vehicle computing system 104 may be used to generate or facilitate use of the bounds stored in topological tree 110.

Vehicle computing system 104 and/or topological planner system 106 can provide a bound to central data store 108 to store, as either bound attributes 116, and/or bound information in centralized bound store 114. The bound includes an identifier or map to facilitate an interface or exchange of bound information based on the bound identifiers of node bound set 112 via the bound stored in bound attributes 116.

In some non-limiting embodiments or aspects, vehicle computing system 104 and topological planner system 106 include one or more devices capable of receiving, storing, processing, and/or providing bound store 114 as a centralized storage point, to enable prevention and/or elimination of copying of identical constraints and reducing memory allocation during tree expansion (e.g., as described further below, bounds are stored in a database or other storage separate from the nodes, this separation may eliminate or reduce complicated computations which may place limits or restrictions on the number of distinct constraint sets which can be evaluated when building candidate constraint sets and trajectories, etc.). In some non-limiting embodiments or aspects, bound store 114 may include sample times, sample locations, longitudinal-bound map, and a lateral bound map, programmed or configured as: sample times may include the sample times for longitudinal bounds that are representing longitudinal constraints as a function of time; sample locations may include the longitudinal sample locations along the reference path for lateral bounds representing lateral constraints as a function of longitudinal distance along the reference path; a longitudinal bound map may include a map that may be used to generate references to bound attributes 116 based on a bound identifier (e.g., bound ID→Bound) for all longitudinal bounds used in topological planner system 106; and, a lateral bound map may include a map for referencing a bound based on a bound identifier (e.g., bound ID→Bound) for all lateral bounds used in topological planner system 106. As can be seen at map bound information 132 of FIG. 1A, central data store 108 may provide connections, communications, information, programming interfaces, or other services (e.g., map bound information services) for finding and obtaining bounds or other information using a reference to a bound that is stored or managed in bound attributes 116.

Bound attributes 116 are an exemplary storage of bound defining attributes for one or more topological bounds, including at least one of an identifier ("ID"), a bound side, a sample index interval, and a distance. In some non-limiting embodiments or aspects, bound attributes 116 defining a bound, include at least (e.g., specific fields, data, or information which can be used to extrapolate information relating to the fields, etc.) the following: bound identifier(s) (ID) comprising a unique ID which may be used to query the bound (e.g., look-up, etc.) in a central bound storage, and may include multiple unique bound identifiers for a constraint; bound-side identifiers (e.g., min, max, etc.) indicating the constraint is imposing either a minimum bound or a maximum bound; sample index intervals that define an index interval identifying the interval for the samples over which the bound is defined, the index interval indicating the sample times in the case of a longitudinal bound or indicating sample locations along the reference path in the case of lateral constraints; and, bound distance, which may include a set of distances (e.g., a vector of distances, etc.) for each sample index contained within the index interval or only one distance for all sample indices within the index interval, the distance identifying a position of the bound (e.g., with respect to a reference path of autonomous vehicle 102, etc.) at a particular sample time or sample location, and if only a single distance is provided instead of a set of distances, the single distance remains uniform and corresponds to a distance with respect to a reference path at all sample times or sample locations for an associated bound (e.g., a distance may not change for a stop constraint where a bound is set at a fixed distance, etc.).

The constraint imposed by a bound comprises either a minimum constraint (e.g., a minimum bound) or a maximum constraint (e.g., a maximum bound). For example, a minimum or maximum bound is defined in terms of a position from a side of the reference path (e.g., laterally, longitudinally, a combination of lateral and longitudinal, etc.) or, alternatively, outward to a side of the vehicle (e.g., a configuration space of autonomous vehicle 102 that includes the size and the heading of the autonomous vehicle 102 for making accurate calculations). If a convention of positive Y direction being left is assumed, then a minimum lateral bound asserts that the autonomous vehicle 102 should pass the associated constraint on the left, and similarly a maximum lateral bound asserts that the autonomous vehicle 102 should pass the vehicle on the right. A most restrictive maximum bound can be defined by a bound having the minimum distance of all maximum bounds. Likewise, a most restrictive minimum bound can be defined by a bound having a maximum distance of all minimum bounds. Accordingly, the most restrictive bound is defined as the bound with the minimum distance of all maximum bounds, or conversely the bound with the maximum distance of all the minimum bounds.

For example, a distance at a sample index may be determined by the topological planner system 106 when it receives data sets, and in one example, two data sets are determined ({0, 10.0}, {1, 10.0}, {2, 10.0}, {3, 10.0}, {4, 10.0}, {5, 30.0}) for representing a longitudinal bound, with a number of sample times of size 10. In the example, and as shown, the distance bounds are 10.0 (e.g., follow/track behind, keep/track ahead, etc.) in a range from indices 0 through 5, and then 30.0 from there until a destination or end. In another example, a distance at a sample index may be determined by the topological planner system 106 when it receives data sets, and in one example, five data sets are determined ({0, 5.0}, {1, 7.0}, {2, 10.0}, {3, 7.0}, {4, 5.0}) for representing a lateral bound, with a number of sample locations of size 5. In the example, and as shown, the distance to bounds are 5.0 (e.g., pass on right, pass on left, etc.) in a first sample location (e.g., a first end, etc.), 7.0 at a second sample location, 10.0 at a third sample location, 7.0 at a fourth sample location, and 5.0 at a fifth sample location or destination (e.g., a second end, etc.). It is understood that constraints have been defined in terms of orientation to a side, front, back, left, or right of the autonomous vehicle 102, however, a person of skill in the art would understand that similar orientations or naming conventions may be interchangeable.

In some non-limiting embodiments or aspects, topological bound distances (e.g., a distance from an autonomous vehicle 102 to a bound) are sampled at specific times for longitudinal bounds and specific locations along the reference path for lateral bounds. To generalize, bounds rely on generalized sample indices which refer to a common set of sample times (e.g., vector of sample times) for longitudinal bounds and a common set of sample locations (e.g., vector of sample locations along the reference path) for lateral bounds. Sample indices according to some non-limiting embodiments or aspects are discussed in further detail herein with respect to FIG. 4.

The various bounds can be determined by generating, storing, processing, or updating topological tree 110, shown in FIG. 1B, and in completed form, as topological tree 110. One or more paths through topological tree 110 may be used to define a topologically distinct class of trajectories. For example, the one or more paths are comprised of nodes, and while topological planner system 106 is expanding topological tree 110 by generating nodes (e.g., $N_1$, $N_2$, $N_3$, $N_4$, $N_5$, and $N_6$, etc.), the nodes providing boundaries to identify constraints blocking or encroaching on the reference path (e.g., a local region of a nominal route, etc.) of the AV, configured in association with information obtained about the presence of objects ($O_1$, $O_2$), in the roadway, and vehicle information, such as one of speed, direction, orientation, and distance traveled, and/or the like of the autonomous vehicle 102 while navigating through the local region. In some non-limiting embodiments or aspects, the nodes $N_1$, $N_2$, $N_3$, $N_4$, $N_5$, and $N_6$ are generated by topological planner system 106, based on a stored set of bounds (e.g., node bound set 112) during a topological tree expansion.

As shown in FIG. 1B a topologically distinct class may include all the trajectories $TR_3$ (or alternatively $TR_4$) that pass each of the objects $O_1$ and $O_2$, on the left and the right, which corresponds to node $N_8$ (e.g. to pass on the left) or alternatively $N_{13}$ (e.g. to pass on the right) in topological tree 110 as shown in FIG. 1B, that was expanded in FIG. 1A. Alternative trajectories may be associated with navigating along a longitudinal trajectory of $TR_1$, $TR_2$. In some non-limiting embodiments or aspects, a trajectory represents a topologically distinct class which includes all the trajectories corresponding to navigating a unique set of constraints (e.g., a candidate constraint set), represented by an optimized trajectory $TR_4$ which passes each of the objects $O_1$, $O_2$ on the right, and corresponds to node $N_{13}$ in topological tree 110. FIG. 1B also illustrates a topologically distinct class which includes all the trajectories corresponding to navigating a unique set of constraints (e.g., a candidate constraint set), represented by $TR_3$ that pass object $O_1$, $O_2$ on the left, and corresponds to node $N_8$ in topological tree 110 of FIGS. 1A and 1B. The trajectories TIM, $TR_2$, $TR_3$, and $TR_4$ each belong to a different homotopic class. Within a homotopic class, trajectories can be continuously deformed (e.g., a merger of one or more trajectories) into one or more different trajectories that maintain a capability to satisfy respective properties (e.g., attributes, characteristics, requirements, etc.) of the bounds $B_1$, $B_2$, $B_3$, $B_4$, $B_5$, $B_6$ without encroaching on any obstacles. However, such deformation is not possible across homotopic classes.

Other topologically distinct classes may be determined for the local region by taking different longitudinal actions with respect to $O_1$, $O_2$, or alternatively, by taking different lateral actions with respect to $O_1$, $O_2$. For example, as shown in FIG. 1B, a class may include all the trajectories that pass object $O_1$ on the right, but track behind object $O_2$, which corresponds to node $N_8$ in the tree graph, which corresponds to a different set of candidate constraints and, therefore, a trajectory TR different from $TR_3$ or $TR_4$. In another example, as shown in FIG. 1B, a class may include all the trajectories that pass object $O_1$ on the left, but track behind object $O_2$, which corresponds to a different set of candidate constraints resulting in a trajectory TR for node $N_{11}$ in the tree graph.

The system may also compute a set of constraints (including one or more constraints) for each topologically distinct class of trajectories determined through topological planning, where the constraint set defines a trajectory (e.g. a convex envelope, a bounded area based on a constraint, etc.) in curvilinear space within which the autonomous vehicle's trajectory is confined. As discussed above, a bound for the autonomous vehicle 102 may comprise only discrete actions with respect to each object (e.g., to be ahead of or behind something, pass to the left or right, or the like) while a trajectory may comprise a plurality of actions. Each discrete action yields one or more constraints in curvilinear space. For example, the system may consider the following actions (e.g., discrete actions, etc.) which yield the following constraints: with respect to restricted areas, such as intersections and crosswalks: stop—yields a constraint to stop before entering a restricted area; and proceed—no constraint. Longitudinal actions with respect to each object includes: track behind—yields an upper bound constraint on distance between the object and the autonomous vehicle 102 along the reference path with respect to time; track ahead—yields a lower bound constraint on distance between the object and the autonomous vehicle along the reference path with respect to time; and ignore—no constraint on distance along the reference path with respect to time—the autonomous vehicle 102 may pass the object at any time. Lateral actions with respect to each object includes at least one of: pass on left—yields a right bound constraint on lateral offset from the reference path; pass on right—yields left bound constraint on lateral offset from the reference path; and, ignore—provides no constraint on lateral offset.

In some non-limiting embodiments or aspects, pruning methods are used to limit the number of candidate constraint sets.

In some non-limiting embodiments or aspects, vehicle computing system 104 and topological planner system 106 include one or more devices capable of receiving, storing, processing, and/or providing pruning methods that are used to efficiently reduce the number of candidate constraint sets. Topological tree expansion is exponential in complexity (considering every combination of choices between constraints) and, therefore, pruning steps are determined in order to limit the number of nodes which are expanded during topological planning. Furthermore, only a limited number of candidate constraint sets can be passed on to trajectory optimization, so pruning is also necessary to limit a number of candidate constraint sets to the most promising constraint sets (e.g., those candidate constraint sets that are feasible and not redundant, etc.).

For example, when executing a feasibility pruning function, a tree node can be determined infeasible during expansion based on a set of actions described by the tree node, when the min bounds and max bounds overlap. To determine the feasibility of a tree node, all min bounds may be compared against all max bounds, and if any min and max bounds overlap in excess of a predefined feasibility tolerance, then the actions prescribed by the tree node are determined to be infeasible and the tree node is pruned from the topological tree. This feasibility pruning is generally executed for each node in the topological tree (e.g., per tree node).

The topological planner system 106 determines the feasibility of a tree node by comparing all min bounds in the tree node to all max bounds contained in the tree node. However, before feasibility pruning may be performed, topological planner system 106 compares the sample index of the bound against the sample index of a plurality of other active bounds (e.g., the inactive bounds can be ignored) on an opposite side (e.g., opposite side of the autonomous vehicle 102) to determine a feasible bound where the sample index does not overlap. In topological tree 110, the bound may be either a minimum bound or a maximum bound based on a distance from a reference path. In such an example, topological planner system 106 compares one of the plurality of other active bounds to the bound. The one of the plurality of other active bounds can be the other of the minimum bound or the maximum bound, with respect to the bound (e.g., either active or inactive). Continuing with the example, topological planner system 106 may identify, compare, and determine that a sample of the bound is coextensive (e.g., includes the same sample location, includes the sample time, shares at least a portion of a sample index, etc.) with a sample of the one of the plurality of active bounds in the roadway. Next, topological planner system 106 determines a bound distance that the bound overlaps a bound distance of the one of the plurality of other active bounds. As an example, when the bound distance of the bound overlaps (e.g., the max bound is less than the min bound, the min bound is greater than the max bound) a bound distance of the one of the plurality of active bounds (within the same tree node), a tree node associated with the bound is removed. For example, topological planner system 106 prunes (e.g., removes) a node associated with the bound based on infeasibility from topological tree 110. In some examples, a feasibility tolerance is applied to determine feasibility. For example, when the distance of overlap between the bound and the one of the plurality of active bounds satisfies a feasibility tolerance threshold, topological planner system 106 prunes a node associated with the bound, or alternatively, a node associated with the other bound of the plurality of active bounds overlapping with the node associated with the bound.

Continuing with FIG. 1A, in some non-limiting embodiments or aspects, vehicle computing system 104 and topological planner system 106 can prune a topological tree by executing a strict redundancy pruning. For example, in pruning based on strict redundancy, if choosing different actions results in identical topological bounds, then all but one node can be pruned. Topological planner system 106 can determine whether nodes are strictly redundant between pairs of relevant nodes, by comparing each tree node against every other tree node at a same topological tree level (e.g., a root level, a first level, a second level, etc.). If topological planner system 106 does not determine redundancy between all bounds in each pair of nodes compared (e.g., based on a quadratic complexity in number of nodes and number of bounds), then the node cannot be ignored.

In some non-limiting embodiments or aspects, for efficiency, redundant tree nodes are identified by comparing the active bound IDs between nodes and ignoring inactive bound IDs. In such an example, a node is redundant when any node bound set 112 are redundant based only on the active bounds therein (e.g., active bound identifiers, etc.), and regardless of any inactive bounds (e.g., inactive bound identifiers may be ignored, etc.). When two tree nodes are determined to be redundant, only one of the nodes is then to be considered (e.g., the other node may be eliminated from consideration).

Continuing with FIG. 1A, in some non-limiting embodiments or aspects, topological planner system 106 may not check bound identifiers during strict redundancy pruning of a topological tree, but rather may extrapolate information about bounds based only on bound distances or other bound information. In such an example, this enables bound attributes 116 to prune when different constraints produce bounds with identical distances, such as when the autonomous vehicle 102 is stopped and all optional stop constraints (e.g., HARD, SOFT, NOMINAL) are identical. This may be because different object constraints for exactly overlapping predicted trajectories produce identical bounds.

Topological planner system 106 may also execute a fuzzy (e.g., inexact, lossy, etc.) redundancy pruning. In some cases, additional pruning in the form of fuzzy redundancy pruning is necessary when feasibility and strict redundancy pruning leave an intractable number of nodes to expand. Fuzzy redundancy pruning is used to further prune the number of nodes while still maintaining a diverse set of trajectory options based on a set of collapsed bounds. In some non-limiting embodiments or aspects, collapsed bounds are generated per tree node and also maintained throughout a tree expansion. The collapsed bounds allow for an efficient implementation of fuzzy redundancy pruning as described below.

Fuzzy redundancy pruning may be used to prune nodes where the bounds are similar, but not exactly the same. The collapsed bounds are used to determine how similar the bounds are between nodes to determine if they should be merged into a single node to improve runtime efficiency. If choosing different actions result in tree nodes with most restrictive min/max bounds which fall within some tolerance, then all but one node can be pruned as redundant. The naive implementation has similar complexity to strict redundancy pruning. Collapsed bounds according to some non-limiting embodiments or aspects is shown and described in more detail herein with respect to FIG. 4D.

Topological planner system 106 may be programmed or configured to provide an intermediate data structure, such as a set of collapsed bounds, having properties or characteristics similar to what is known in the art as being of a lossy type of structure or character, where information that is determined to be unnecessary may be discarded or not used, while the technique may still identify (e.g., through elimination of bounds, etc.) and store the most restrictive bounds or bound distances for node bound set 112. This can provide more efficient evaluation of node redundancy as described below, and also sufficiently eliminates bounds that have little or no impact on planning, while retaining those that may more likely impact planning. Unlike other pruning techniques, topological planner system 106 may compare the most restrictive bound distance for a node having differing active node bound sets. Topological planner system 106 may generate and provide a time varying set of fuzzy tolerances (e.g., based on the sample index interval, etc.) which include a plurality of tolerances (e.g., a vector of tolerances, etc.) corresponding to the sample index interval. However, topological planner system 106 may not need to compare the most restrictive bound distance to node distances of nodes that are not active (i.e., they are not a most restrictive bound at any node).

The above actions and constraints are provided for example purposes, and other possible actions and/or constraints are within the scope of this disclosure. It should be noted that the constraints take into account, with respect to the autonomous vehicle, current velocity, speed limit in the local region, acceleration limit, deceleration limit, prediction data relating to objects in the autonomous vehicle environment, or the like.

Figure 2:
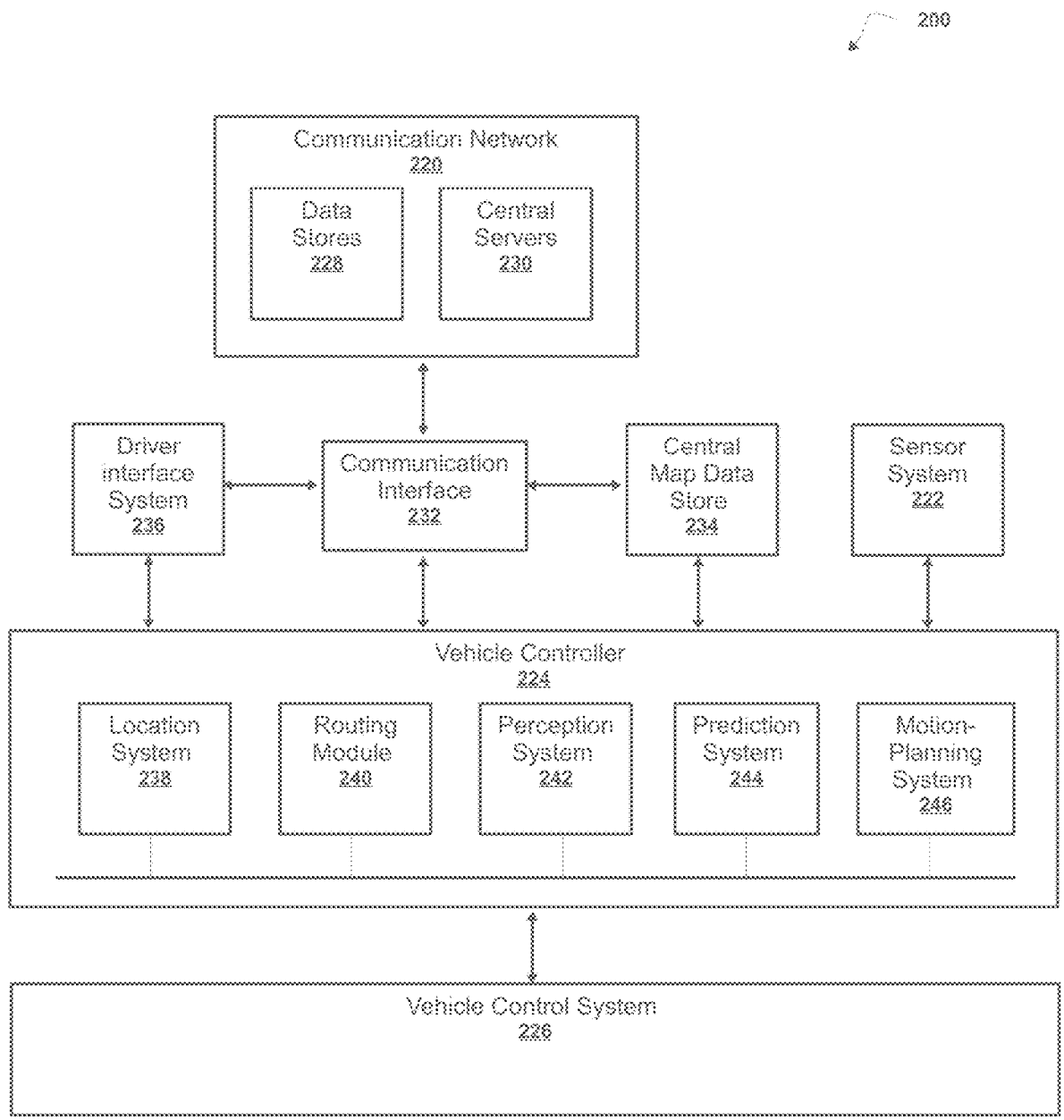
FIG. 2 is a diagram of non-limiting embodiments or aspects of an autonomous vehicle in which topological planning and vehicle control, as described herein, may be implemented.

Referring now to FIG. 2, FIG. 2 is a diagram of an example vehicle computing system 200 in which devices, systems, and/or methods, described herein, may be implemented. Vehicle computing system 200 may be the same as or different than vehicle computing system 140 and additionally, or alternatively may include topological planning system 106 and central data store 108. As shown in FIG. 2, vehicle computing system 200 includes communication network 220, sensor system 222, vehicle controller 224, and vehicle control system 226. Vehicle computing system 200 may interconnect (e.g., establish a connection to communicate and/or the like) via communication network 220 to remote data and processing systems (e.g., sources, computing devices, external computing systems, etc.) of data store(s) 228 and central server(s) 230, for example, communication interface 232 of vehicle computing system 200 may utilize wired connections and/or wireless connections to provide an input or output exchange with local vehicle systems (e.g., one or more systems of autonomous vehicle 102, etc.).

With continued reference to FIG. 2, autonomous vehicle 102 may additionally or alternatively include sensor system 222, vehicle controller 224, vehicle control system 226, central map data store 234, and driver interface system 236. Autonomous vehicle 102 may further include certain components (not shown here) included in vehicles, such as, an engine, wheels, steering wheel, transmission, etc., which may be controlled by vehicle control system 224 or, alternatively, vehicle controller 226, using a variety of communication signals and/or commands, such as, for example, acceleration signals or commands, deceleration signals or commands, steering signals or commands, braking signals or commands, etc.

In some non-limiting embodiments or aspects, vehicle computing system 200 includes components for autonomous operation of autonomous vehicle 102 to store or retrieve (e.g., request, receive, etc.) vehicle information from one or more data stores 228 and/or one or more central servers 230 via communication interface 232. For example, vehicle computing system 200 may synchronize (e.g., update, change, etc.) data of data store(s) 228 or interfaces of driver interface system 236, with map data (e.g., a portion of map data) in central map data store 234 or vehicle control information processed in central servers 230 as autonomous vehicle 102 is traversing a roadway. Multiple autonomous vehicles may be coupled to each other and/or coupled to data stores 228 and/or central servers 230 by communication interface 232. Communication interface 232 may be any type of network such as a local area network (LAN), a wide area network (WAN) such as the Internet, a cellular network, a satellite network, or a combination thereof, and may be wired or wireless. Remote data store(s) 228 may be any kind of data stores such as, without limitation, map data stores, traffic information data stores, user information data stores, point of interest data store(s), or any other type of content data store(s). Central server(s) 230 may be any kind of servers or a cluster of servers, such as, without limitation, Web or cloud servers, application servers, backend servers, or a combination thereof.

Sensor system 222 may include one or more sensors that are coupled to vehicle controller 224 and/or otherwise connected or included within autonomous vehicle 102 of FIGS. 1A and 1B. Examples of such sensors include, without limitation, a Light Detection and Ranging (LiDAR) system, a Radio Detection and Ranging (RADAR) system, one or more cameras (e.g., visible spectrum cameras, infrared cameras, etc.), temperature sensors, position sensors, location sensors (e.g., global positioning system (GPS), etc.), fuel sensors, speed sensors, odometer sensors, motion sensors (e.g., inertial measurement units (IMU), accelerometer, gyroscope, etc.), object detection sensors such as one or more camera humidity sensors, environmental sensors (e.g., a precipitation sensor and/or ambient temperature sensor)

occupancy sensors, or the like. The sensor data can include information that describes the location of objects within the surrounding environment of autonomous vehicle 102, information about the environment itself, information about the motion of autonomous vehicle 102, information about a route of the autonomous vehicle, or the like.

With continued reference to FIG. 2, vehicle controller 224 may receive data collected by sensor system 222 and analyze it to provide one or more vehicle control instructions to vehicle control system 226. Vehicle controller 224 may include, without limitation, location system 238, perception system 242, prediction system 244, and motion planning system 246.

Location system 238 may include and/or may retrieve map data (e.g., map information, etc.) from central map data store 234 that provides detailed information about the surrounding environment of the autonomous vehicle 102. In some non-limiting embodiments or aspects, location system 238 may include and/or may retrieve map data (e.g., map information, etc.) from central map data store(s) 234, central server(s) 230, central map data store 234, and/or a combination, that provides detailed information about the surrounding environment of the autonomous vehicle 102. The map data can provide information regarding: the identity and location of different roadways, road segments, buildings, or other items; the location and directions of traffic lanes (e.g., the location and direction of a parking lane, a turning lane, a bicycle lane, or other lanes within a particular roadway); traffic control data (e.g., the location and instructions of signage, traffic lights, or other traffic control devices); and/or any other map data that provides information that assists vehicle controller 224 in analyzing the surrounding environment of the autonomous vehicle. In some non-limiting embodiments or aspects, the map data may also include reference path information that correspond to common patterns of vehicle travel along one or more lanes such that the motion of the object is constrained to the reference path (e.g., locations within traffic lanes on which an object commonly travels). Such reference paths may be pre-defined such as the centerline of the traffic lanes. Optionally, the reference path may be generated based on historical observations of vehicles or other objects over a period of time (e.g., reference paths for straight line travel, lane merge, a turn, or the like).

In some non-limiting embodiments or aspects, location system 238 may also include and/or may receive information relating to a trip or route of a user, real-time traffic information on the route, and/or the like.

Location system 238 may include and/or may be in communication with routing module 240 that generates a navigation route from a start position to a destination position for an autonomous vehicle 102. Routing module 240 may access central map data store 234 to identify possible routes and road segments that a vehicle can travel on to get from the start position to the destination position. Routing module 240 may score the possible routes and identify a preferred route to reach the destination. For example, routing module 240 may generate a navigation route that minimizes Euclidean distance traveled or other cost function during the route and may further access the traffic information and/or estimates that can affect an amount of time it will take to travel on a particular route. Depending on implementation, routing module 240 may generate one or more routes using various routing methods, such as Dijkstra's algorithm, Bellman-Ford's algorithm, or other algorithms. Routing module 240 may also use the traffic information to generate a navigation route that reflects expected conditions of the route (e.g., current day of the week or current time of day, etc.), such that a route generated for travel during rush-hour may differ from a route generated for travel late at night. Routing module 240 may also generate more than one navigation route to a destination and send more than one of these navigation routes to a user for selection by the user from among various possible routes.

Based on the sensor data provided by sensor system 222 and information obtained by location system 238, perception system 242 may determine perception information of the surrounding environment of autonomous vehicle 102 during travel from the start position to the destination along the preferred route. The perception information may represent what an ordinary driver would perceive in the surrounding environment of a vehicle. The perception data may include information relating to one or more objects in the environment of autonomous vehicle 102. For example, perception system 242 may process sensor data (e.g., LiDAR or RADAR data, camera images, etc.) in order to identify objects and/or features in the geospatial area of autonomous vehicle 102. The objects may include traffic signals, roadway boundaries, other vehicles, pedestrians, and/or obstacles, etc. Perception system 242 may use any now or hereafter known object recognition algorithms, video tracking algorithms, and computer vision algorithms (e.g., track objects frame-to-frame iteratively over a number of time periods) to determine the perception.

In some non-limiting embodiments or aspects, perception system 242 may also determine, for one or more identified objects in the environment, the current state of the object. The state information may include, without limitation, for each object: current location; current speed and/or acceleration; current heading; current orientation; size/footprint; type (e.g., vehicle vs. pedestrian vs. bicycle vs. static object or obstacle); and/or other state information.

Prediction system 244 may predict the future locations, trajectories, and/or actions of the objects based at least in part on perception information (e.g., the state data for each object) received from perception system 242, the location information received from location system 238, the sensor data, and/or any other data that describes the past and/or current state of the objects, autonomous vehicle 102, the surrounding environment, and/or their relationship(s). For example, if an object is a vehicle and the current driving environment includes an intersection, prediction system 244 may predict whether the object will likely move straight forward or make a turn. If the perception data indicates that the intersection has no traffic light, prediction system 244 may also predict whether the vehicle may fully stop prior to entering the intersection. Such predictions may be made for a given time horizon (e.g., 5 seconds in the future). In certain embodiments, prediction system 244 may provide the predicted trajectory or trajectories for each object to the motion planning system 246.

Motion planning system 246 may determine a motion plan for the autonomous vehicle 102 based on the perception data and/or the prediction data. Specifically, given predictions about the future locations of proximate objects and other perception data, motion planning system 246 can determine a motion plan for autonomous vehicle 102 that best navigates autonomous vehicle 102 relative to the objects at their future locations.

In some non-limiting embodiments or aspects, motion planning system 246 may receive the predictions from prediction system 244 and make a decision regarding how to handle objects in the environment of autonomous vehicle 102. For example, for a particular object (e.g., a vehicle with a given speed, direction, turning angle, etc.), motion planning system 246 decides whether to overtake, yield, stop, and/or pass based on, for example, traffic conditions, map data, state of the autonomous vehicle 102, etc. In some non-limiting embodiments or aspects, for a given object, motion planning system 246 may decide a course to handle the object and may determine one or more safe actions for responding to the presence of the object. For example, for a given object, motion planning system 246 may decide to pass the object, and then may determine whether to pass on the left side or right side of the object (including motion parameters, such as, speed and lane change decisions). Motion planning system 246 may also assess the risk of a collision between a detected object and autonomous vehicle 102. If the risk exceeds an acceptable threshold, it may determine whether the collision can be avoided if the autonomous vehicle follows a defined vehicle trajectory and/or implements one or more dynamically generated emergency maneuvers is performed in a pre-defined time period (e.g., N milliseconds). If the collision can be avoided, then vehicle controller 224 may transmit appropriate control instructions to vehicle control system 226 for execution to perform a cautious maneuver (e.g., mildly slow down, accelerate, change lane, or swerve). In contrast, if the collision cannot be avoided, then vehicle controller 224 may transmit appropriate control instructions to vehicle control system 226 for execution of an emergency maneuver (e.g., brake and/or change direction of travel).

Furthermore, motion planning system 246 also plans a trajectory ("trajectory generation") for autonomous vehicle 102 to travel on a given route (e.g., a nominal route generated by routing module 224). The trajectory specifies the geospatial path for the autonomous vehicle 102, as well as, a velocity profile. The controller converts the trajectory into control instructions for the vehicle control system 226, including but not limited to throttle/brake and steering wheel angle commands. Trajectory generation may involve making decisions relating to lane changes, such as, without limitation, whether a lane change is required, where to perform a lane change, and when to perform a lane change. Specifically, one objective of motion planning system 246 is to generate a trajectory for motion of the vehicle from a start position to a destination on the nominal route, taking into account the perception and prediction data.

Motion planning system 246 may generate the trajectory by performing topological planning using the topological planning techniques described herein to generate a set of constraints for each of a plurality of topologically distinct classes of trajectories, optimizing a single candidate trajectory for each class, and scoring the candidate trajectories to select an optimal trajectory. Topological classes are distinguished by the discrete actions taken with respect to obstacles or restricted map areas. Specifically, all possible trajectories in a topologically distinct class perform the same action with respect to obstacles or restricted map areas. Obstacles may include, for example, static objects such as traffic cones and bollards, or other road users such as pedestrians, cyclists, and cars (e.g., moving cars, parked cars, double parked cars, etc.). Restricted map areas may include, for example, crosswalks and intersections. Discrete actions may include, for example, to stop before or proceed through, to track ahead or behind, or to pass on the left or right of an object (e.g., obstacle, constraint, etc.).

Motion planning system 246 may use the preferred route information provided by routing module 224 in combination with perception data, prediction data to select the optimal trajectory, as discussed below.

As discussed above, planning and control data regarding the movement of the autonomous vehicle 102 is generated by motion planning system 246 of controller 120 that is transmitted to vehicle control system 226 for execution. Vehicle control system 226 may, for example, control braking via a brake controller; direction via a steering controller; speed and acceleration via a throttle controller (in a gas-powered vehicle), or a motor speed controller (such as, a current level controller in an electric vehicle); a differential gear controller (in vehicles with transmissions); and/or other controllers.

In the various embodiments discussed in this document, the description may state that the vehicle or a controller included in the vehicle (e.g., in an on-board computing system) may implement programming instructions that cause the controller to make decisions and use the decisions to control operations of one or more vehicle systems via the vehicle control system of the vehicle. However, the embodiments are not limited to this arrangement, as in various embodiments the analysis, decision making, and/or operational control may be handled in full or in part by other computing devices that are in electronic communication with the vehicle's on-board controller and/or vehicle control system. Examples of such other computing devices include an electronic device (such as, a smartphone) associated with a person who is riding in the vehicle, as well as, a remote server that is in electronic communication with the vehicle via a wireless network. The processor of any such device may perform the operations that will be discussed below.

With further reference to FIG. 2, communication interface 232 may be configured to allow communication between autonomous vehicle 102 and external systems, such as, for example, external devices, sensors, other vehicles, servers, data stores, databases etc. Communication interface 232 may utilize any now or hereafter known protocols, protection schemes, encodings, formats, packaging, etc., such as, without limitation, Wi-Fi, an infrared link, Bluetooth, etc. Driver interface system 236 may be part of peripheral devices implemented within autonomous vehicle 102 including, for example, a keypad, a touch screen display device (such as a graphical user interface GUI)), a microphone, and a speaker, etc. For example, autonomous vehicle 102 may include a GUI on which is displayed a trajectory of autonomous vehicle 102, such as by indicating an upcoming route of autonomous vehicle 102 as it navigates around one or more objects. The trajectory displayed on GUI may be one that is determined through the topological planning process described herein.

Figure 3:
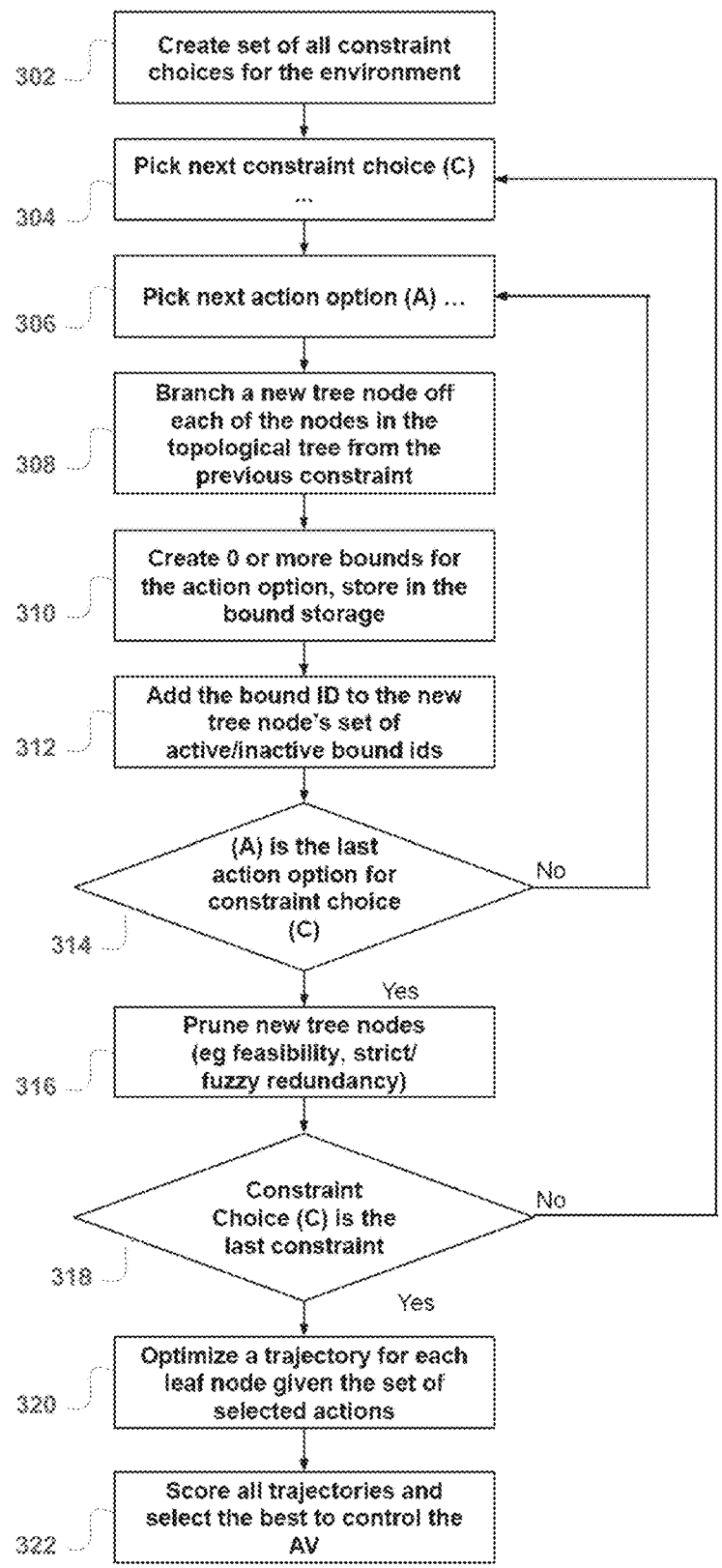
FIG. 3 is a flowchart illustrating a non-limiting embodiment or aspect of a method for topological planning according to the principles of the present disclosure.

Referring now to FIG. 3, a step diagram is shown for the process 300 that occurs at the vehicle computing system 104 to determine a trajectory for the AV 102. In some non-limiting embodiments or aspects, one or more of the steps of process 300 for topological planning with bounds representations may be performed (e.g., completely, partially, and/or the like) by autonomous vehicle 102 (e.g., one or more devices of autonomous vehicle 102). In some non-limiting embodiments or aspects, one or more of the steps of process 300 may be performed (e.g., completely, partially, and/or the like) by vehicle computing system 104 (e.g., one or more devices of vehicle computing system 104), by topological planning system 106 (e.g., one or more devices of topological planning system 106), by central data store 108 (e.g., one or more devices of central data store 108).

At a first step 302, a set of all constraint choices is created for the environment. For example, constraint choices include stop constraints choices, intersection constraint choices, and object constraint choices. At step 304, the next constraint choice (C) is selected for determining an action, and at step 306 a next action option (A) is selected. A constraint choice may include one or more action options (e.g., IGNORE, TRACK_BEHIND, TRACK_AHEAD, etc.). At step 308, a new tree node is branched off each of the nodes in the topological tree from the previous constraint (e.g., the preceding constraint in the hierarchical order of the tree). At step 310, zero or more bounds are created for the action option and stored in the bound storage. Then a bound ID for any bounds that are created, is added to the new tree node's set of active/inactive bound ids at step 312.

Next, at step 314 it is determined if the next action option (A) is the last action option for the next constraint choice (C). If there are further action options to be incorporated into the node, the method loops back to step 305. Once all of the desired action options have been added to the tree node, at step 316 the newly generated or created tree nodes are pruned. For example, the tree nodes are pruned with feasibility pruning, strict redundancy pruning, or fuzzy redundancy pruning. If there are further constraint choices (e.g., Constraint Choice (C) is determined to not be the last constraint) to be incorporated into the node, the method loops back to step 305.

After branching is complete (e.g., all constraints considered, etc.) a convex constraint set is generated from each leaf node and the trajectory optimization system generates multiple trajectories, one of which is chosen as the optimal trajectory for the AV to follow. For example, if there are no further constraint choices to be incorporated, at step 320, a trajectory is generated and optimized for each leaf node of the topological tree given the set of selected actions. Finally, at step 322, all trajectories are scored, and a trajectory is selected to control the AV.

In some non-limiting embodiments or aspects, map data and sensor data received and/or associated with a plurality of constraints in a geographic area. For example, vehicle computing system 104 receives map data and sensor data associated with a plurality of constraints in a geographic area of an autonomous vehicle 102 traversing a route on a roadway.

In some non-limiting embodiments or aspects, autonomous vehicle 102 obtains sensor data that includes parameter information associated with one or more parameters collected as a vehicle transitions through a trajectory while traversing a roadway in a local region. For example, the sensor data may be collected by vehicles during travel, specifically for collecting data for mapping and/or during normal operations (e.g., non-mapping specific, etc.). The sensor data in the vehicle logs can be stored locally and/or sent to a central system to be processed (e.g., stored, aggregated, etc.), and including one or more parameters, such as, for example, x-value coordinates (e.g., a latitude, etc.), y-value coordinates (e.g., a longitude, etc.), z-value coordinates (e.g., an elevation, height, or altitude relative to the ground and/or sea level, etc.), heading (e.g., a yaw, etc.), pitch of the vehicle (e.g., a pitch angle, grade, or incline that is positive for upward movement of the vehicle nose and negative for downward movement of the vehicle nose, etc.), pitch rate, longitudinal speed, longitudinal acceleration, yaw, yaw rate, latitudinal speed, latitudinal acceleration, roll, roll rate, and/or the like.

Autonomous vehicle 102 (e.g., vehicle computing system 106, etc.) includes one or more devices capable of obtaining sensor data associated with a detected constraint in an environment of local region or otherwise surrounding autonomous vehicle 102. For example, autonomous vehicle 102 can include one or more computing systems including one or more processors (e.g., one or more servers, etc.) and one or more devices capable of obtaining sensor data (e.g., one or more wide angle cameras, LiDAR, RADAR, accelerometers, gyroscopes etc.).

In some non-limiting embodiments or aspects, vehicle computing system 104 and/or autonomous vehicle 102 include one or more devices capable of receiving, storing, and/or providing map data (e.g., map data, AV map data, coverage map data, hybrid map data, submap data, Google's S2 geometry data, etc.) associated with a map (e.g., a map, a submap, an AV map, a coverage map, a hybrid map, an S2 cell, etc.) of a geographic location (e.g., a country, a state, a city, a portion of a city, a township, a portion of a township, etc.).

In some non-limiting embodiments or aspects, a topological tree may be expanded by adding a plurality of nodes to represent a plurality of actions. For example, topological planner system 106 generates a topological tree 110 by adding a plurality of nodes to represent a plurality of actions associated with the plurality of constraints when expanding topological tree 110. In some examples, the plurality of actions are associated with an object (e.g., a vehicle, pedestrian, etc.), a stop, an intersection, a lane, or a map boundary. For example, while traversing a local region between a current position of autonomous vehicle 102 and a destination, topological planner system 106 expands topological tree 110 to include a plurality of topologically distinct classes by analyzing the spatial relationships appearing in the roadway. For example, a location of a first object and a location of a second object are determinative of attributes of topological tree 110, such as an arrangement of nodes.

In some non-limiting embodiments or aspects, the relationships among data in topological tree 110 are established so that one node exists as a subordinate of another. The nodes may have parent-child relationships and are modelled using the "tree" data structure.

In some non-limiting embodiments or aspects, topological planner system 106 expands topological tree 110 by adding a plurality of nodes representing actions for navigating a plurality of constraints. Topological planner system 106 expands topological tree 110 to include a plurality of nodes associated with constraints for longitudinal and lateral action options associated with constraints in a roadway. For example, topological planner system 106 expands a tree of topological decisions with respect to constraints in the AV's environment, wherein, as successive planning decisions are made, topological planner system 106 updates a representation of the geographic area around the AV using topological bounds as a means to determine the feasibility of choosing various permutations of topological decisions. Making a topological decision for a constraint will generally result in a subset of decisions for other constraints becoming dynamically infeasible.

In some non-limiting embodiments or aspects, each node in the tree contains both longitudinal and lateral actions based on a selected action set. The bounds rely on generalized sample indices which refer to a common set of sample times (e.g., vector of sample times) for longitudinal bounds and a common set of sample locations (e.g., vector of sample locations along the reference path) for lateral bounds. The actions may be situated with respect to a configuration space of autonomous vehicle 102. The configuration space includes at least one of a speed, direction, heading of the vehicle, and size of the vehicle. A distance to a constraint from autonomous vehicle 102 may include a distance from a center of the configuration space of autonomous vehicle 102 to any outside location in the geographic area.

In some non-limiting embodiments or aspects, topological planner system 106 may update topological tree 110 before autonomous vehicle 102 has passed an object, while passing the object, or after passing the object, an update tree expansion may account for different positions of autonomous vehicle 102 with respect to the object, while their respective positions are changing. Before passing the object, topological tree 110 may include a node comprising one or more options for passing or tracking the object. In some examples, updating the tree includes removing a node, or a level of nodes, such as, for example, when they are no longer relevant, such as, when an object is no longer in the roadway, if an object has repositioned, and/or the like. For example, topological planner system 106 may update topological tree 110 after autonomous vehicle 102 has passed an object to eliminate node storing options for passing or tracking the object.

In some examples, topological planner system 106 determines topological tree 110 by adding a plurality of nodes at a first level of topological tree 110, such that any node of the plurality of nodes added to the first level corresponds to potential action sets for an object. For example, topological planner system 106 expands the plurality of nodes by adding nodes to the first level and adds a second plurality of nodes to a second level, indicating the first level nodes are associated with actions for navigating a first constraint (e.g., intersection, object, traffic sign, traffic signal, lane boundaries, etc.), and the subsequent nodes in the second level are for navigating the second constraint in the roadway (e.g., intersection, object, traffic sign, traffic signal, lane boundaries, etc.). In another level, such as, a second level that is different from the first level, a plurality of nodes may be expanded for responding to a second object in the roadway.

In some non-limiting embodiments or aspects, the nodes may be connected, assembled, or combined to form distinct classes of trajectory. Autonomous vehicle 102 may be controlled in a distinct class of trajectory corresponding to a unique set of nodes, formed by a hierarchical path through topological tree 110. The unique path comprises a plurality of trajectories to avoid objects $O_1$, $O_2$. In some examples, each topologically distinct class may be associated with a plurality of trajectories that take the same discrete actions with respect to objects in the local region.

In some non-limiting embodiments or aspects, topological planner system 106 expands topological tree 110 to include any number of topologically distinct classes by analyzing the spatial relationships of autonomous vehicle 102 with respect to the objects $O_1$, $O_2$ and with respect to a reference path. For example, the AV may yield to objects $O_1$, $O_2$ by tracking behind an object or by passing based on one or more bounds representing a plurality of discrete actions associated with the plurality of constraints, based on the position of the objects with respect to the reference path.

In some non-limiting embodiments or aspects, a bound (e.g., a new bound, an added bound, a bound indicating an interval, etc.) is generated based on a constraint associated with at least one object in the geographic area. For example, topological planner system 106 generates a bound based on a constraint associated with at least one object of the plurality of constraints in the geographic area, the bound associated with an action for navigating the autonomous vehicle 102 relative to the at least one object.

In some non-limiting embodiments or aspects, vehicle computing system 104 or topological planner system 106 includes one or more devices capable of generating bound store 114. For example, bound store 114 may include sample times, sample locations, a longitudinal bound map, and a lateral bound map.

For example, generating the bound includes generating one or more sample times. The sample times and sample locations are fixed and determined before generating any bounds. The sample times may be a pre-defined time-grid and sample locations, in some examples, the sample locations are uniformly spaced samples along the reference path. Generating the bound may also include defining one or more sample locations to comprise lateral bounds for representing lateral constraints as a function of a lateral distance with respect to a reference path. In some non-limiting embodiments or aspects, sample times are generated before topological expansion by advancing from a planning epoch time at predefined sample time durations. Similarly, sample locations are defined along the reference path at a predetermined spacing along the reference path.

The bound storage may include a longitudinal bound map. A longitudinal bound map includes a map for storing bound attributes 116 based on a bound identifier. For example, vehicle computing system 104 determines or generates a longitudinal bound represented in topological tree 110, defining a longitudinal constraint in the roadway as a function of time. The distance may change as the corresponding time increases, or the distance may remain static to uniformly enforce a distance over time, such as, when a longitudinal bound includes a bound for tracking behind or in front of an object, comprising a static distance to the object while the time increases. As an example, autonomous vehicle 102 may track behind a vehicle in the roadway, and any signage, such as, a stop sign or other markings in the roadway.

A lateral bound map may comprise a function map for referencing a bound based on a bound identifier. For example, a lateral bound map may be used by vehicle computing system 104 to determine a bound based on a bound identifier. The lateral bound map, mapping all lateral bounds to the bound ID, is used in topological tree 110.

In some non-limiting embodiments or aspects, central data store 108 may include one or more devices for providing a mapping interface that can be used for finding and obtaining bounds that have been added to the system. For example, bound storage may generate a request for information based on a reference (e.g., bound ID) to a bound.

In some non-limiting embodiments or aspects, generating a bound includes generating bound attributes 116 to define a bound. Bound attributes 116 may include a unique identifier ("ID"). The bound is stored in the bound map (bound storage) based on a bound id, which is the bound ID that is the unique ID for the bound.

In some non-limiting embodiments or aspects, topological planner system 106 may include a bound set update that may provide an interface to automatically update the set of bounds to active or inactive bounds when a new bound is added. In such an example, topological planner system 106 generates a plurality of bound types that include a bound identifier for an active bound and at least one bound identifier associated with at least one inactive bound. In some examples, topological planner system 106 maintains a set of active bound identifiers to enable representation of the most restrictive constraints. An active bound may be defined as a bound which at a sample index in a geographic area of autonomous vehicle 102 includes a most restrictive bound when compared to any other bound.

In some non-limiting embodiments or aspects, generating the bound also includes generating or determining bound-side identifiers (e.g., min, max, etc.). A bound-side identifier may indicate a side pertaining to the constraint imposed by bound. For example, a bound may impose either a minimum bound or a maximum bound. Bound side identifiers, according to some non-limiting embodiments or aspects, is discussed in more detail herein with respect to FIG. 4A.

In some non-limiting embodiments or aspects, a bound comprises at least one of a longitudinal bound or a lateral bound, and a sample index interval to ensure efficient memory usage by reducing the number of comparisons.

In some non-limiting embodiments or aspects, vehicle computing system 104 or topological planning system 106 includes one or more devices for generating or determining a sample index interval. The sample index interval may provide the interval for interpreting the samples. The samples along the sample index interval may include a set of distances which can be combined with the sample index interval to form a time-based sample set indicating a restrictive distance at each discrete time interval. Sample indices according to some non-limiting embodiments or aspects are discussed in further detail herein with respect to FIG. 4.

In some non-limiting embodiments or aspects, generating or determining a bound may also include generating or determining one or more bound distances. A bound distance may include a set of distances (e.g., a vector of distances, etc.), or alternatively, only one distance. For example, the bound distance may identify a position of the bound (e.g., with respect to autonomous vehicle 102, with respect to a reference path of autonomous vehicle 102, etc.) at a particular sample time or sample location in the sample index interval. However, if only a single distance is provided instead of a plurality of distances, the single distance remains uniform and corresponds to controlling autonomous vehicle 102 for yielding to a longitudinal bound, comprising a uniform distance away from the object. The uniform distance may be projected for all sample times or sample locations of an associated bound (e.g., a distance may not change for a stop constraint where a bound is set at a fixed distance, etc.).

In some non-limiting embodiments or aspects, the bound is stored in a central data storage of the autonomous vehicle 102. For example, central data store 108 stores the bound (e.g., new bound, added bound, etc.) in a central data storage of autonomous vehicle 102. In some non-limiting embodiments or aspects, central data store 108 includes at least bound store 114 and bound attributes 116 (e.g., as part of a collection of tables or other database objects, etc.) and is located onboard autonomous vehicle 102. However, node bound set 112 is stored separately and refers back to objects of central data store 108, to ensure that vehicle computing system 104, central data store 108, and topological planner system 106 do not duplicate the bound data across nodes, while providing additional bound metadata including the bound type and desired offset.

In some examples, topological planner system 106 generates node bound set 112, such that node bound set 112 is stored separate and apart from central data store 108, node bound set 112 is separate from a database management system of central data store 108, node bound set 112 is separate from a database schema of central data store 108, node bound set 112 is separate from a storage medium of central data store 108, and/or the like.

In some non-limiting embodiments or aspects, a bound can have (or provide) an action for many nodes. In some non-limiting embodiments or aspects, bounds of node bound set 112 may be stored based on a one-to-many relationship, where one bound stored in the central data store can be associated with one or more bounds in one or more node bound sets that are stored and processed by topological tree 110.

In some non-limiting embodiments or aspects, storing the bound in central data store 108 of autonomous vehicle 102, comprises storing the bound data for at least bound store 114 and bound attributes 116 in a central database management system, while storing node bound set 112 in a memory database, while topological planner system 106 provides storage of node bound set 112 based on an interface or other instructions for generating and storing topological tree 110 away from central data store 108. For example, topological tree 110 may be stored in an in-memory database management system or loaded temporarily and programmatically (e.g., in the course of executing programming instructions, etc.). In some examples, topological planner system 106 primarily relies on main memory for computer data storage.

In some non-limiting embodiments or aspects, storing a bound in a central data storage of the autonomous vehicle 102, may eliminate or reduce the allocation of memory and ensure that no more than that is necessary is used to represent the bounds. In addition, memory allocation and deallocation can be reduced (e.g., calls to malloc may be reduced and/or minimized, etc.). In this way, vehicle computing system 104 may represent fixed bounds with a single fixed value, while maintaining capability to support the efficient retrieval of bound distances by time, location, and by bound ID (e.g., constraint identifier, etc.).

In some non-limiting embodiments or aspects, vehicle computing system 104 and topological planner system 106 include one or more devices capable of receiving, storing, processing, and/or providing bound store 114 as a centralized bound store. In some examples, bound store 114 provides capabilities that prevent and/or eliminate repetitious copies of identical constraints and reduces memory allocation during tree expansion (e.g., as described further below, bounds are stored in a database instead of in an accessible memory to eliminate or reduce complicated computations which may place limits on the number of distinct constraint sets which can be evaluated when building candidate constraint sets and trajectories, etc.).

Topological planner system 106 links a set of bounds of a tree node to the bound stored in the central bound storage via a bound identifier, wherein the bound is initially linked as an active bound, or alternatively, as an inactive bound only after determining it is not the most restrictive bound at any sample index.

In some non-limiting embodiments or aspects, topological planner system 106 may include one or more devices capable of generating, storing, communicating, linking, comparing, updating, or removing a set of bounds that are relevant to each node of topological tree 110. For example, topological planner system 106 determines node bound set 112 which includes a set of active bound identifiers and inactive bound identifiers representing actions for avoiding a constraint in a particular sample index. In such an example, node bound set 112 may include a combination of bounds that are only relevant to a particular set of constraints at a location in the roadway represented by the particular node of topological tree 110. Node bound set 112 may also include one or more bound identifiers for each bound that are defined at a sample index in the local region.

In some non-limiting embodiments or aspects, provided in any node bound set 112 are at least two active bounds and any number of inactive bounds. For example, the active bounds of node bound set 112 include a constraint which represents the most restrictive boundary when compared to any other bound in node bound set 112, this includes a most restrictive bound for both a maximum and minimum constraint (e.g., a min bound, a max bound, etc.). Node bound set 112 also includes inactive bound identifiers, defined as bounds which at all sample indices are less restrictive than any other active bound. In this example, when pruning topological tree 110, to determine feasibility pruning and redundancy pruning, an inactive bound may be ignored.

Vehicle computing system 104 and/or topological planner system 106 include one or more devices capable of receiving, storing, processing, and/or providing a bound to central data store 108 to store, as either bound attributes 116, and/or bound information in bound store 114. The bound information includes an identifier or map to facilitate an interface or exchange of bound information based on the bound identifiers of node bound set 112 via the bound stored in bound attributes 116.

In some non-limiting embodiments or aspects, topological planner system 106 links a set of bounds of a tree node to the bound via a bound identifier, wherein the bound is initially linked as an active bound. For example, topological planner system 106 determines the new bound is active when it is determined to be a most restrictive bound for the set of active bounds of the tree node at any sample index. Alternatively, topological planner system 106 determines the new bound is inactive when the new bound is never the most restrictive bound at any sample index. In some examples, in response to linking the set of bounds of the tree node to the bound, topological planner system 106 determines the bound is active or inactive.

In some non-limiting embodiments or aspects, bounds are used to reduce processing. For example, bounds with non-overlapping sample index intervals can be ignored when checking bounds against each other by comparing one or more sample locations or one or more sample times along an index interval which it is specified. In such an example, it is unnecessary to compare bounds since they are not determined to overlap, and a search domain is reduced to improve efficiency when determining bound redundancy and bound feasibility. In some examples, the sample index interval is spanned by the active bound in the geographic area.

In some non-limiting embodiments or aspects, a search domain is reduced to improve efficiency when determining bound redundancy and bound feasibility, by limiting a search for one or more bounds to a bound found to be associated with a current sample index interval and limiting the search for the one or more bounds to only active sets of bounds of the tree node.

In some non-limiting embodiments or aspects, a sample index interval may include minimum (min) and maximum (max) sample indices into a list of sample times or sample locations (e.g., a sample times/location vector, etc.). Sample indices according to some non-limiting embodiments or aspects are discussed in further detail herein with respect to FIG. 4.

In some non-limiting embodiments or aspects, pruning one or more nodes from the topological tree includes at least one of a) feasibility pruning, b) strict redundancy pruning, or c) fuzzy pruning, to eliminate at least one node or, alternatively, to eliminate at least one bound, for determining a trajectory to navigate one or more constraints along the geographic area of the roadway being traversed by the autonomous vehicle, wherein the geographic area includes the sample index.

Topological tree pruning according to some non-limiting embodiments or aspects is discussed in more detail herein with respect to FIGS. 4A-4E.

In some non-limiting embodiments or aspects, vehicle computing system 104 and topological planner system 106 include one or more computing devices for providing, determining, or generating a plurality of candidate constraint sets which specify semantic longitudinal actions or lateral actions. For example, the constraint set may include the bound for determining the action of at least one of the following: stop at a stop line, pass object on right, pass object on left, yield behind, or yield ahead. In some examples, controlling the autonomous vehicle 102 based on topological tree 110 includes generating or optimizing a plurality of trajectories based on a candidate constraint set. After generating a plurality of constraint sets, controlling the autonomous vehicle 102 based on topological tree 110 may include selecting and initiating an optimal trajectory of the plurality of trajectories. In some examples, the optimal trajectory represents the bound, such as, for example, when the bound is an active bound that has not been pruned as redundant or infeasibility. In such an example, determining the optimal trajectory further comprises optimizing a trajectory by determining and scoring the trajectory based on a candidate constraint set of the plurality of candidate constraint sets. For example, the candidate constraint set may be based on a plurality of bounds of a plurality of nodes connected together in topological tree 110. In some examples, the plurality of nodes may satisfy a plurality of constraints, and the optimal trajectory comprises a feasible trajectory with respect to lateral limits, longitudinal limits, or dynamic limits of the autonomous vehicle 102. Additional details regarding the use of topological tree to control the autonomous vehicle 102 are described above with respect to FIGS. 1A and 1B. For example, with reference to FIG. 1B, autonomous vehicle 102 can be controlled by following any of the three feasible trajectories $TR_1$, $TR_2$, $TR_3$, outlined in topological tree 110.

Figure 4A:
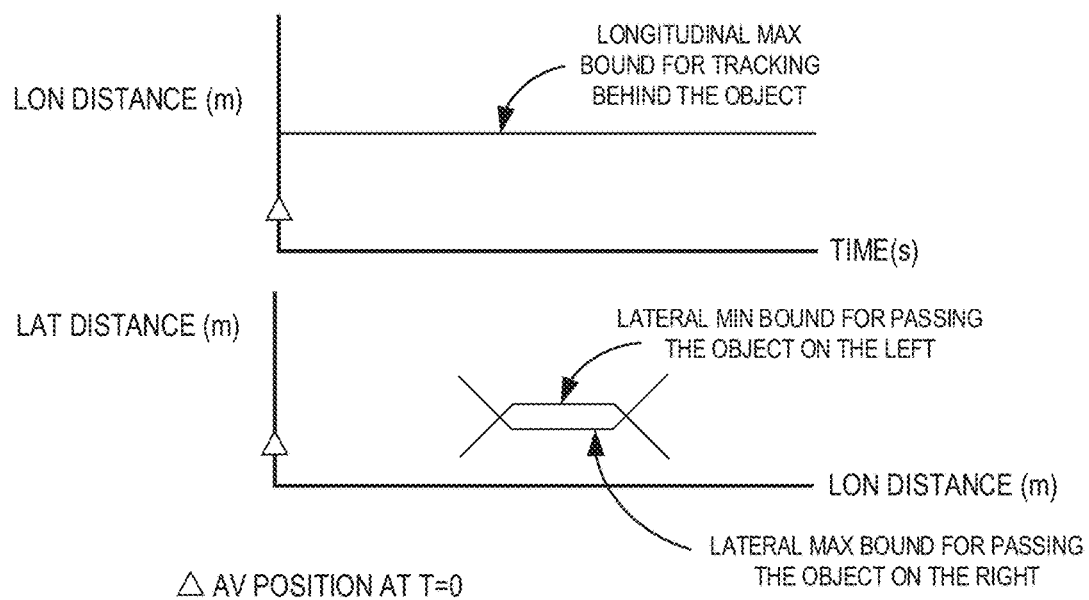
FIGS. 4A-4E are diagrams of non-limiting embodiments or aspects showing examples of constraint bounds employed for a topological tree pruning in a topological planning system according to principles of the present disclosure.
Figure 4B:
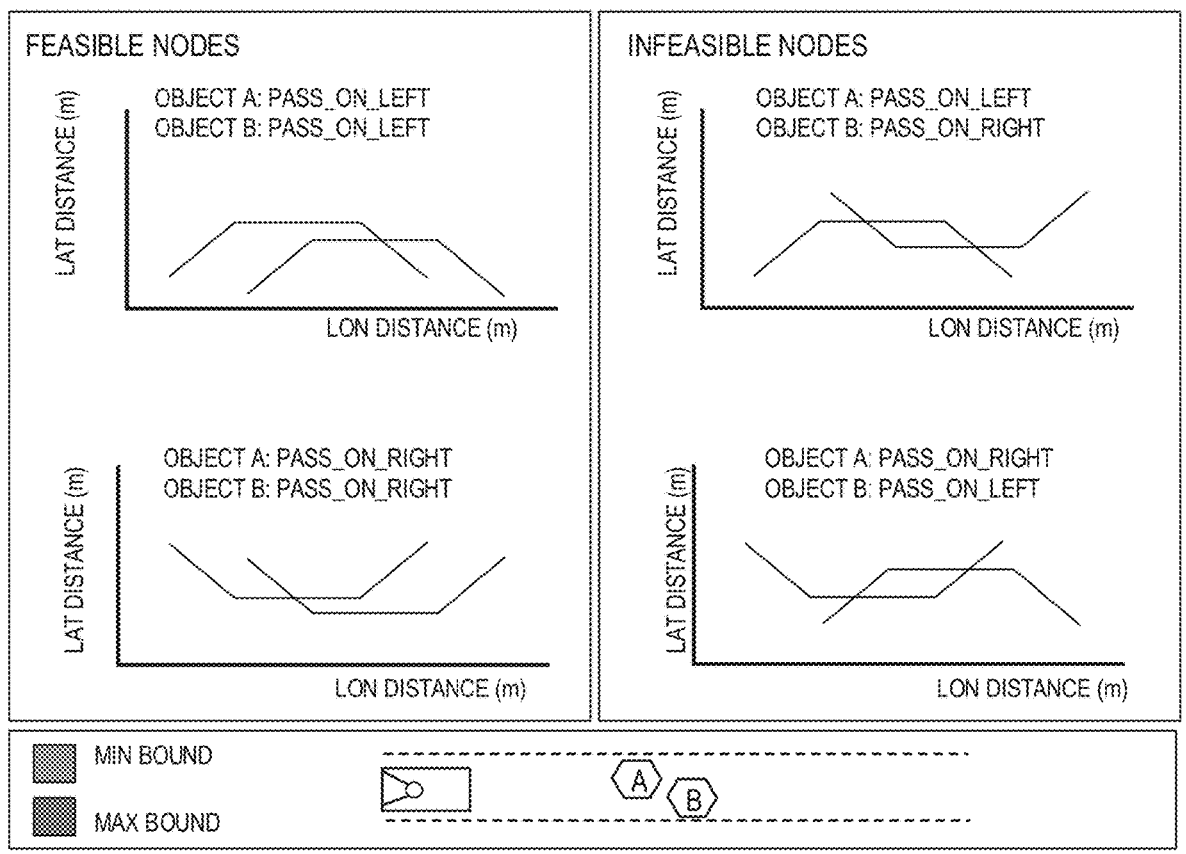
Figure 4C:
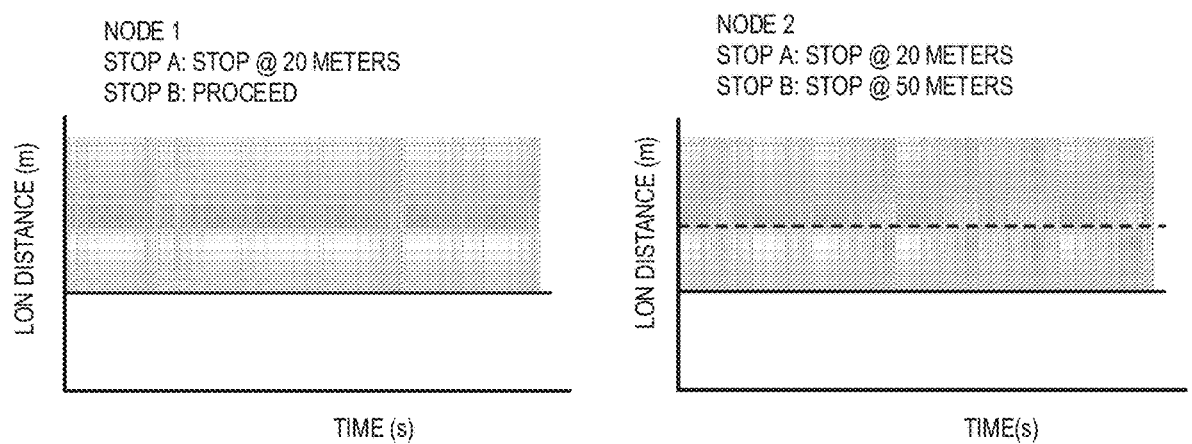
Figure 4D:
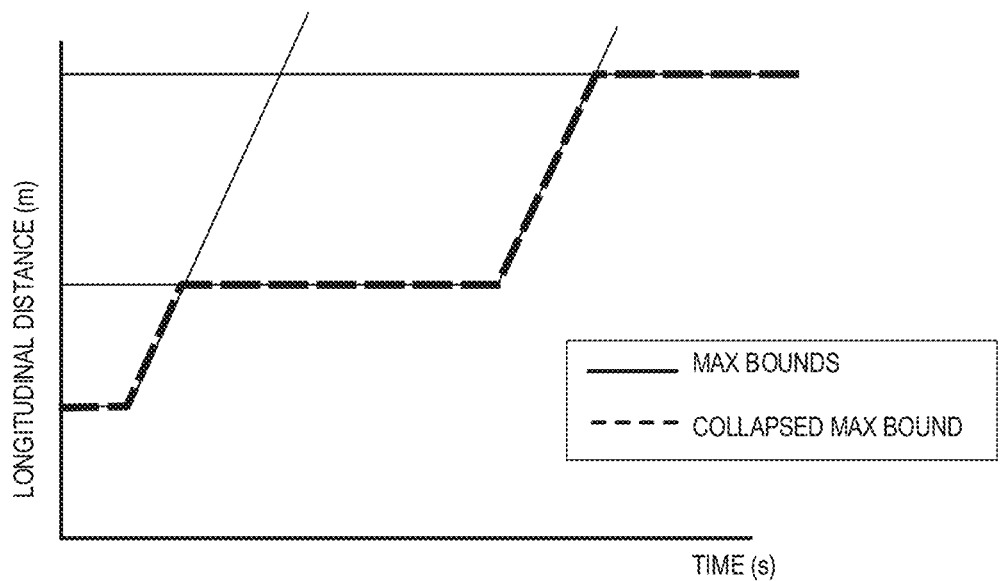
Figure 4E:
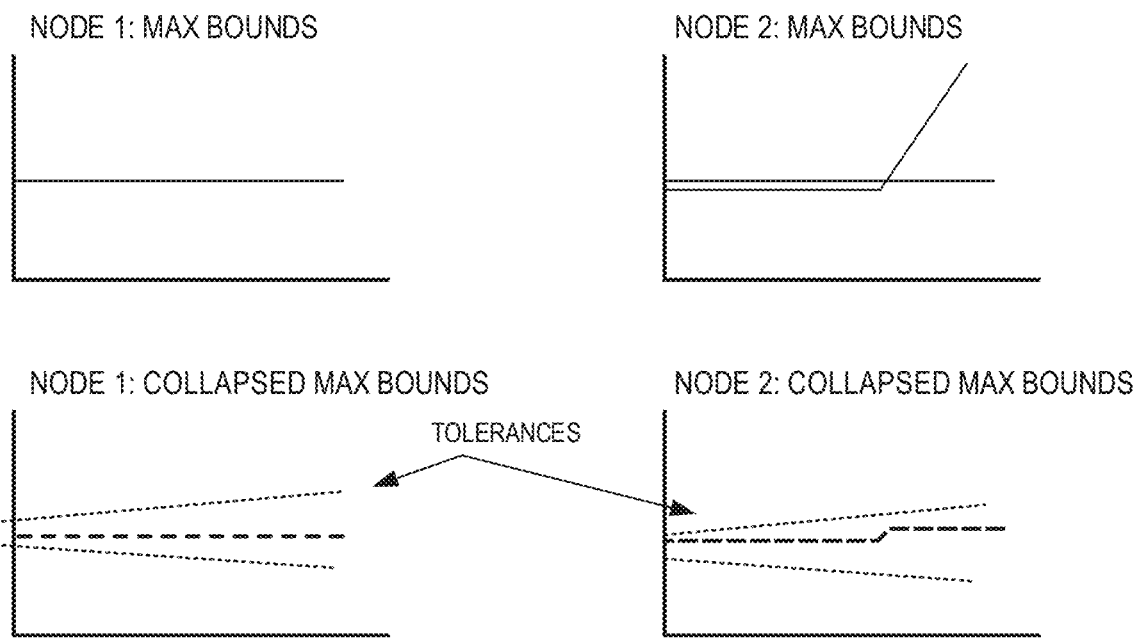

FIGS. 4A-4E show an example of constraint bounds employed for a topological tree pruning. For example, FIG. 4A shows an example longitudinal bound, a lateral max bound, and a lateral min bound, FIG. 4B shows (left) corresponding feasible nodes and (right) infeasible nodes based on input of the autonomous vehicle navigating the local region (below) of the input image divided in patches, FIG. 4C shows an example node (1) pruned as redundant, FIG. 4D, shows exemplary collapsed bounds, and FIG. 4E shows max bounds and collapsed max bounds for pruning based on fuzzy redundancy.

With further reference to FIG. 4B, topological planner system 106 can determine that a tree node is dynamically infeasible if, considering the set of actions described by a tree node as shown in FIG. 4A, the min bounds and max bounds overlap. For example, as shown in FIG. 4B, a feasible node does not overlap, while any infeasible nodes are overlapping, meaning the bounds are such that the autonomous vehicle cannot meet all constraints simultaneously. In the example of FIG. 4B, autonomous vehicle 102 can pass both objects A and B on the left (both objects are min bounds) or, alternatively, autonomous vehicle 102 can pass both objects A and B on the right (objects are max bounds), as indicated by the two feasible nodes. However, autonomous vehicle 102 cannot pass object A on the left (object A is min bound) and then pass object B on the right (object B is max bound) nor could autonomous vehicle 102 pass object A on the right (object A is max bound) and then pass object B on the left (object B is min bound), as indicated by the two infeasible nodes.

In some non-limiting embodiments or aspects, topological planner system 106 determines the feasibility of a tree node by comparing all min bounds in the tree node to all max bounds contained in that tree node. In some non-limiting embodiments or aspects, before feasibility pruning may be performed, topological planner system 106 compares the sample index of the bound against the sample index of a plurality of other active bounds on an opposite side of the autonomous vehicle 102 to determine a feasible bound where the sample index does not overlap. In topological tree 110, the bound may be either a minimum bound or a maximum bound based on a distance from a reference path. In such an example, topological planner system 106 compares one of the plurality of other active bounds to the bound. The one of the plurality of other active bounds can be the other of the minimum bound or the maximum bound, with respect to the bound. Continuing with the example, topological planner system 106 may identify, compare, and determine that a sample of the bound is coextensive (e.g., includes the same sample location, includes the sample time, shares at least a portion of a sample index, etc.) with a sample of the one of the plurality of active bounds in the roadway. Next, topological planner system 106 determines a bound distance that the bound overlaps a bound distance of the one of the plurality of other active bounds. In an example, where the bound distance overlaps a bound distance of the one of the plurality of active bounds, a tree node associated with the bound is removed. For example, topological planner system 106 prunes (e.g., removes) a node associated with the bound based on infeasibility from topological tree 110. In some examples, a feasibility tolerance is applied. For example, when the distance of overlap between the bound and the one of the plurality of active bounds satisfies a feasibility tolerance threshold, topological planner system 106 prunes a node associated with the bound, or alternatively, a node associated with the other bound of the plurality of active bounds overlapping with the node associated with the bound.

With further reference to FIG. 4C, topological planner system 106 can determine a tree node by pruning a bound based on strict redundancy. In some non-limiting embodiments or aspects, topological planner system 106 identifies a redundant tree node by comparing a first plurality of active bounds in the node and a second plurality of active bounds in a new node. For example, when comparing a first plurality of active bounds in the node and a second plurality of active bounds in the new node, topological planner system 106 determines the tree node is strictly redundant when all of the active bound IDs are identical. In another example, topological planner system 106 determines the tree node is strictly redundant when a plurality of active bounds in the node and the plurality of active bounds in the new node are within a redundant tolerance threshold. For example, after determining a strictly redundant node, topological planner system 106 prunes the redundant tree node for redundancy from topological tree 110. As an example, topological planner system 106 determines the tree node is redundant and removes the redundant node, thereby eliminating at least one node from topological tree 110. In FIG. 4C, as an example, Node 1 can be pruned since the action at Stop A is redundant in both Node 1 and Node 2 (i.e., both Node 1 and Node 2 require STOP @ 20 meters for Stop A).

With further reference to FIG. 4E, topological planner system 106 can determine a topological tree by further pruning a plurality of nodes with a fuzzy redundancy pruning technique, while still maintaining a diverse set of trajectory options. For example, when an intractable number of nodes remain, it may be inefficient to expand and/or sufficient computing may be unavailable to prune the intractable number of nodes. In some non-limiting embodiments or aspects, when pruning a bound based on fuzzy redundancy, topological planner system 106 receives, generates, determines, or stores (e.g., in the central data storage, in bound store, in bound attributes, etc.), a collapsed minimum and maximum longitudinal distance associated with a most restrictive bound distance of the set of bounds of the tree node at each sample time and location.

In some non-limiting embodiments or aspects, vehicle computing system 104 and/or topological planner system 106 may include one or more devices for generating a plurality of tolerances at a plurality of sample indexes that increase as a distance of a sample increases from a distance of an initial sample of the plurality of sample indexes. In some examples, fuzzy tolerance may become iteratively (e.g., increasingly) less restrictive as a function of distance (e.g., based on increasing sample index, based on increasing distance, etc.). In some non-limiting embodiments or aspects, topological planner system 106 may prune (e.g., remove) based on binary criteria that is decided a priori. For example, an infeasibility tolerance is set a priori, a tolerance set too tight may over-prune and too loose may under-prune. Still further, topological planner system 106 compares for each of a plurality of tolerances, a pair of tree nodes that are not pruned to a collapsed set of bounds. For example, when a number of tree nodes is above a threshold number of unpruned tree nodes, topological planner system 106 compares a collapsed minimum and maximum longitudinal bound against a tolerance of the plurality of tolerances at each sample index. Topological planner system 106 may prune a node found to be a least restrictive node when a bound distance associated with the node is within a tolerance of the plurality of tolerances at each sample index of the plurality of sample indexes. As shown, fuzzy pruning may include a time-varying allowable tolerance for bound distances. The time variation of the tolerances allows for more relaxed tolerances as time increases to account for the increasing uncertainty of constraint predictions as time increases (e.g., further along a trajectory, further along a roadway, etc.) as well as the diminishing (e.g., decreasing, etc.) effect that small differences in bounds will have on the resulting trajectory as time increases. Effectively equivalent means that the most restrictive bound distance at every sample time or location is equal between the nodes. In some non-limiting embodiments or aspects, topological planner system 106 merges the two nodes together by using the more restrictive action for each choice. Alternatively, topological planner system 106 may determine a preferred node, based on the tolerances or other conditions in the roadway, then the nodes are merged. In some examples, tolerances may be set a priori. In addition, or alternatively, tolerances may adjust as the sample index changes (e.g., increases, decreases, etc.). Pruning is performed iteratively, the tolerance getting tighter (e.g., closer to strict redundancy pruning) every iteration until a number of nodes fall below a target threshold. In this way, topological planner system 106 is capable of reducing the nodes to a tractable number while still providing and maintaining diversity.

Figure 5:
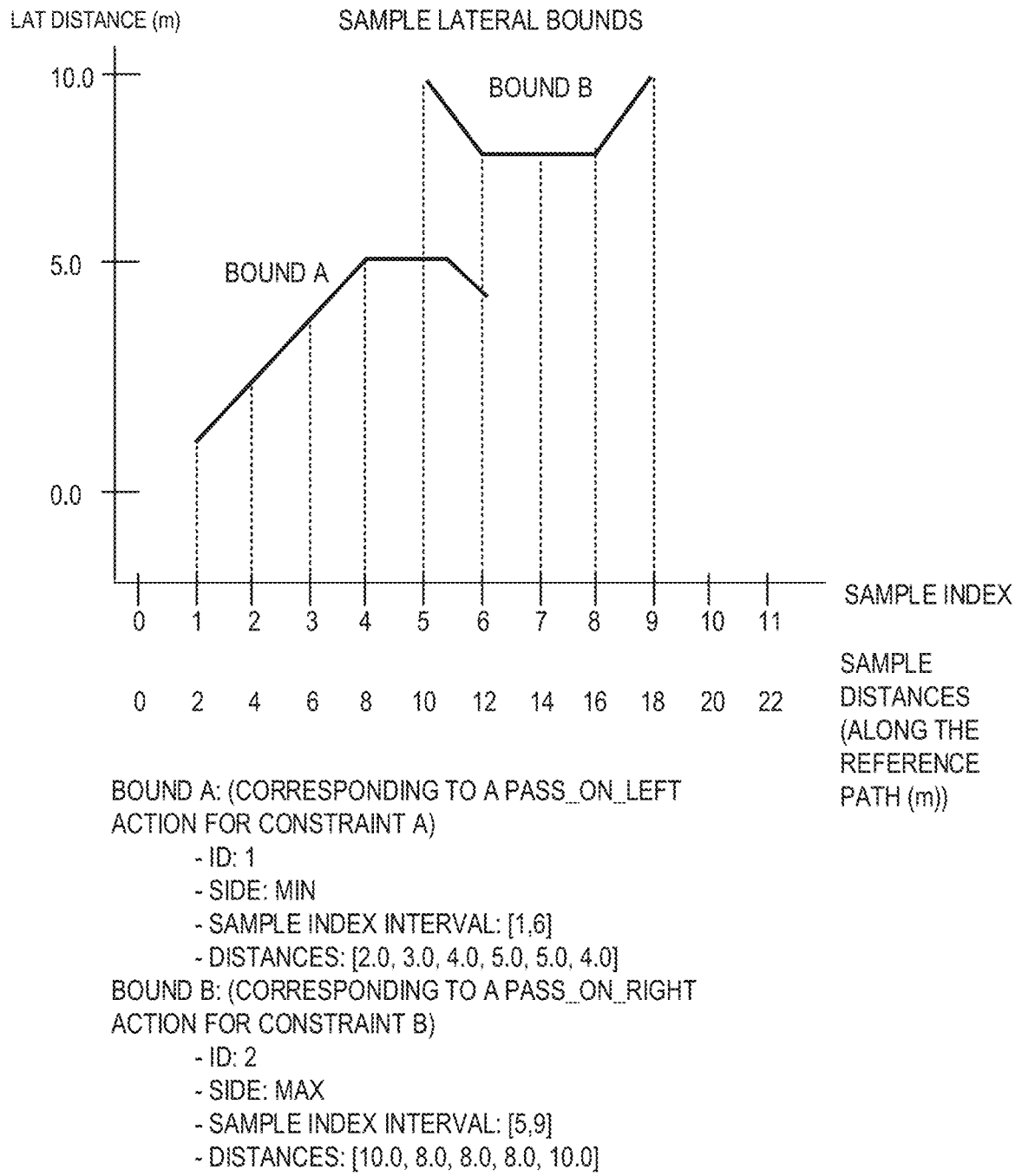
FIG. 5 diagrams non-limiting embodiments or aspects of an example sample index according to principles of the present disclosure.

FIG. 5 shows an exemplary sample index interval employed for a topological tree pruning. For example, FIG. 5 shows an example sample index interval for two bounds. Each bound having only a single sample index interval. As discussed above, a sample index interval may correspond to either time intervals (in the case of longitudinal bounds) or spatial intervals along the reference path (in the case of lateral bounds). As shown, two overlapping lateral bounds each have a multiple sample indices. As an example, the sample index interval defines an index interval identifying the interval for the samples over which the bound is used or defined. The sample index interval in the case of a lateral bound provides sample locations at distances along the reference path which include an indication of the bound position to a max or min side of the reference path.

For example, bound A with a bound ID (1) includes six data sets in the sample index interval [1, 6], comprising ({1, 2.0}, {2, 3.0}, {3, 4.0}, {4, 5.0}, {5, 5.0}, {6, 4.0}) for representing a lateral bound (Bound A), with a number of sample times of size 6. In the Bound A example, and as shown in FIG. 4, the longitudinal distance from the origin to bounds are 2.0 (e.g., pass on right, pass on left, etc.) in a first sample location (e.g., a first end, etc.), 4.0 at a second sample location, 6.0 at a third sample location, 8.0 at a fourth sample location, 10.0 at a fifth sample location or destination, and 12.0 at a sixth sample location or destination (e.g., a second end, etc.). In another example, bound B with a bound ID (2) includes five data sets in the sample index interval sample index interval [5, 9], comprising ({5, 10.0}, {6, 8.0}, {7, 8.0}, {8, 8.0}, {9, 10.0},) for representing a lateral bound (Bound B), with a number of sample times of size 5. In the Bound B example, and as shown in FIG. 4, the longitudinal distance from the origin to bounds are 10.0 (e.g., pass on right, pass on left, etc.) in a first sample location (e.g., a first end, etc.), 12.0 at a second sample location, 14.0 at a third sample location, 16.0 at a fourth sample location, and 18.0 at a fifth sample location or destination (e.g., a second end, etc.). It is understood that constraints have been defined in terms of orientation to a side, front, back, left, or right of the autonomous vehicle 102, however, a person of skill in the art would understand that similar orientations or naming conventions may be interchangeable.

With continuing reference to FIG. 5, in some non-limiting embodiments or aspects, distances between samples in the case of lateral constraints may be used to expand a bound longitudinally with regard to an index interval. The bound distance, which may include a set of one or more distances (e.g., a vector of distances, etc.) for representing a lateral distance from each sample index, the distance identifying a position of the bound with respect to a reference path of autonomous vehicle 102, or alternatively, with respect to autonomous vehicle 102, at a sample location. In such an example, the Bound is applied lateral on a max side or a min side, such as a min side corresponding to a PASS_ON_LEFT action for constraint A using or navigating with respect to bound A, or a max side corresponding to a PASS_ON_RIGHT action for constraint B by using or navigating with respect to bound B. If a convention of positive Y direction being left is assumed, then a minimum lateral bound asserts that the autonomous vehicle 102 should pass the associated constraint on the left, and similarly a maximum lateral bound asserts that the autonomous vehicle 102 should pass the vehicle on the right Although the above systems, methods, and computer program products have been described in detail for the purpose of illustration based on what is currently considered to be the most practical and preferred embodiments, it is to be understood that such detail is solely for that purpose and that the present disclosure is not limited to the described embodiments but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A computer-implemented method of maneuvering an autonomous vehicle traversing a route on a roadway, comprising:
   receiving, by the autonomous vehicle, map data and sensor data associated with a plurality of constraints in a geographic area of the autonomous vehicle;
   expanding, by a computing system of the autonomous vehicle, a topological tree by adding a plurality of nodes to represent a plurality of actions associated with the plurality of constraints, by a process comprising:
      generating, by the computing system, a bound based on a constraint of the plurality of constraints, each constraint of the plurality of constraints specifying a semantic action for traversing an object in the roadway in the geographic area, and the bound identifying at least one of a longitudinal spatial limit and a lateral spatial limit with respect to an action for navigating the autonomous vehicle relative to the constraint; and
      linking, by the computing system, the bound and one or more additional bounds sharing a common constraint in the plurality of nodes of the topological tree; and
   controlling, by the computing system, the autonomous vehicle based on the topological tree, to navigate the plurality of constraints.

2. The computer-implemented method of claim 1, wherein generating bounds further comprises: generating a sample index interval to ensure efficient memory usage by reducing a number of bound comparisons, wherein the sample index interval corresponds to one of a time interval for longitudinal bounds or a spatial interval along a reference path for lateral bounds.

3. The computer-implemented method of claim 2, further comprising:
   generating a plurality of candidate constraint sets that specify semantic longitudinal actions or lateral actions for all constraint choices, the plurality of candidate constraint sets including one or more bounds for determining an action of at least one of stop at stop line, pass object on right, pass object on left, yield behind, or track ahead;
   determining a trajectory by optimizing a semantic action associated with a candidate constraint set of the plurality of candidate constraint sets,
   wherein determining the trajectory further comprises determining and scoring the trajectory based on one or more constraints of the plurality of candidate constraint sets, the candidate constraint set based on a plurality of tree nodes connected together in the topological tree, the plurality of nodes including the one or more bounds satisfying the constraints, and the trajectory comprising a feasible trajectory; and
   selecting and initiating the trajectory.

4. The computer-implemented method of claim 1, further comprising, pruning one or more nodes from the topological tree, wherein the pruning includes at least one of a) feasibility pruning, b) strict redundancy pruning, or c) fuzzy redundancy pruning, to eliminate at least one node, for determining a trajectory to navigate one or more constraints along the geographic area of the roadway being traversed by the autonomous vehicle where 1) the at least one node is pruned as infeasible when it can be determined that a resultant trajectory cannot be feasible given one or more dynamic limitations of the autonomous vehicle, or 2) the at least one node is pruned as redundant when the resultant trajectory is determined to be similar to a trajectory of another node such that only one node can be considered.

5. The computer-implemented method of claim 4, further comprising at least one of:
   a) pruning a bound based on feasibility, comprising:
      comparing the bound against a plurality of opposing active bounds, wherein the bound is either a minimum bound and the opposing bounds are maximum bounds, or the bound is a maximum bound and the opposing bounds are minimum bounds;
      determining an overlap between a sample index interval of the bound and a sample index interval of at least one of the plurality of opposing active bounds; and
      pruning, from the topological tree, the tree node associated with the bound based on infeasibility when a bound distance of the bound and a bound distance of the opposite bound violate each other by a feasibility tolerance threshold at any overlapping sample index;
   b) pruning a bound based on strict redundancy, comprising:
      identifying a redundant tree node by comparing a first plurality of active bounds in a first node and a second plurality of active bounds in a second node, wherein the tree node is redundant when the first node and the second node have identical active bound identifiers or one or more collapsed bounds are within a redundant tolerance threshold; and
      pruning the redundant tree node for redundancy from the topological tree; or
   c) pruning a bound based on fuzzy redundancy, comprising:
      generating and storing in a central bound storage, a collapsed minimum and maximum longitudinal distance associated with a greatest restrictive bound distance of the bound or the one or more additional bounds of the tree node at each sample time/location;
      generating a plurality of tolerances at a plurality of sample indexes that increase as a distance of a sample increases between a distance of an initial sample of the plurality of sample indexes;
      comparing, for each of the plurality of tolerances, for each pair of tree nodes that are not pruned, when a number of tree nodes is above a threshold number of unpruned tree nodes, both of a collapsed minimum and maximum longitudinal bound with a tolerance of each sample index; and
      pruning a node found to be a least restrictive node when a bound distance associated with the node is within a tolerance of the plurality of tolerances at each sample index of the plurality of sample indexes.

6. The computer-implemented method of claim 5, wherein fuzzy redundancy comprises further pruning a plurality of nodes while still maintaining a diverse set of trajectory options when an intractable number of nodes to expand remain after infeasible or strict redundant nodes have been removed.

7. The computer-implemented method of claim 6, wherein a sample index interval maps to one or more times sampled along a reference path to the first bound for a longitudinal bound, or alternatively, a sample index interval maps to one or more longitudinal distances sampled along a reference path for a lateral bound.

8. The computer-implemented method of claim 7, wherein bounds with non-overlapping sample index intervals can be ignored as feasible or non-redundant when checking the bounds against each other.

9. The computer-implemented method of claim 1, further comprising:
   restricting a search domain when determining bound redundancy and bound feasibility by limiting a search for one or more bounds to a bound found to be associated with a current sample index interval and limiting the search for the one or more bounds to only active sets of bounds of the tree node.

10. The computer-implemented method of claim 1, wherein bound attributes are not stored and copied into each tree node, and
   further wherein an inactive bound can be ignored when determining feasibility pruning and redundancy pruning.

11. The computer-implemented method of claim 1, further comprising:
   generating a plurality of collapsed bounds to provide an efficient implementation of fuzzy redundancy pruning and obtain a plurality of diverse constraint sets, wherein the plurality of collapsed bounds are determined throughout the topological tree for each tree node, and include a most restrictive distance at each sample index.

12. The computer-implemented method of claim 1, further comprising:
   determining a candidate constraint set based on a plurality of connected nodes in the topological tree that satisfy one or more constraints with respect to one of the plurality of constraints and provide a feasible trajectory with respect to lateral limits, longitudinal limits, or dynamic limits of the autonomous vehicle.

13. An autonomous vehicle, comprising:
   one or more sensors; and
   a computing system comprising one or more processors, wherein the computing system is programmed and/or configured to:
      receive map data and sensor data associated with a plurality of constraints in a geographic area of the autonomous vehicle;
      expand a topological tree by adding a plurality of nodes to represent a plurality of actions associated with the plurality of constraints, by a process comprising:
         generating, by the computing system, a bound based on a constraint of the plurality of constraints, each constraint of the plurality of constraints specifying a semantic action for traversing an object in a roadway in the geographic area, and the bound identifying at least one of a longitudinal spatial limit and a lateral spatial limit with respect to an action for navigating the autonomous vehicle relative to the constraint; and
         linking the bound and one or more additional bounds sharing a common constraint in the plurality of nodes of the topological tree; and
      control the autonomous vehicle based on the topological tree, to navigate the plurality of constraints.

14. The autonomous vehicle of claim 13, wherein generating bounds further comprises: generating a sample index interval to ensure efficient memory usage by reducing a number of bound comparisons, wherein the sample index interval corresponds to one of a time interval for longitudinal bounds or a spatial interval along a reference path for lateral bounds.

15. The autonomous vehicle of claim 13, wherein the one or more processors are further programmed and/or configured to:

prune one or more nodes from the topological tree, wherein the pruning includes at least one of a) feasibility pruning, b) strict redundancy pruning, or c) fuzzy redundancy pruning, to eliminate at least one node, for determining a trajectory to navigate one or more constraints along the geographic area of the roadway being traversed by the autonomous vehicle where 1) the at least one node is pruned as infeasible when it can be determined that a resultant trajectory cannot be feasible given one or more dynamic limitations of the autonomous vehicle, or 2) the at least one node is pruned as redundant when the resultant trajectory is determined to be similar to a trajectory of another node such that only one node can be considered.

16. The autonomous vehicle of claim 15, wherein the one or more processors are further programmed and/or configured to perform at least one of:
 a) prune a bound based on feasibility, by a process comprising:
  comparing the bound against a plurality of opposing active bounds, wherein the bound is either a minimum bound and the opposing bounds are maximum bounds, or the bound is a maximum bound and the opposing bounds are minimum bounds;
  determining an overlap between a sample index interval of the bound and a sample index interval of at least one of the plurality of opposing active bounds; and
  pruning, from the topological tree, the tree node associated with the bound based on infeasibility when a bound distance of the bound and a bound distance of an opposite bound violate each other by a feasibility tolerance threshold at any overlapping sample index;
 b) prune a bound based on strict redundancy, by a process comprising:
  identifying a redundant tree node by comparing a first plurality of active bounds in a first node and a second plurality of active bounds in a second node, wherein the tree node is redundant when the first node and the second node have identical active bound identifiers or one or more collapsed bounds are within a redundant tolerance threshold; and
  pruning the redundant tree node for redundancy from the topological tree; or
 c) prune a bound based on the fuzzy redundancy, by a process comprising:
  generating and storing in a central bound storage, a collapsed minimum and maximum longitudinal distance associated with a greatest restrictive bound distance of the bound or the one or more additional bounds of the tree node at each sample time/location;
  generating a plurality of tolerances at a plurality of sample indexes that increase as a distance of a sample increases between a distance of an initial sample of the plurality of sample indexes;
  comparing, for each of the plurality of tolerances, for each pair of tree nodes that are not pruned, when a number of tree nodes is above a threshold number of unpruned tree nodes, both of a collapsed minimum and maximum longitudinal bound with a tolerance of each sample index; and
  pruning a node found to be a least restrictive node when a bound distance associated with the node is within a tolerance of the plurality of tolerances at each sample index of the plurality of sample indexes.

17. The autonomous vehicle of claim 16, wherein the fuzzy redundancy comprises further pruning a plurality of nodes while still maintaining a diverse set of trajectory options when an intractable number of nodes to expand remain after infeasible or strict redundant nodes have been removed.

18. The autonomous vehicle of claim 17, wherein a sample index interval maps to one or more times sampled along a reference path to the first bound for a longitudinal bound, or alternatively, a sample index interval maps to one or more longitudinal distances sampled along a reference path for a lateral bound.

19. The autonomous vehicle of claim 18, wherein the one or more processors are further programmed and/or configured to restrict a search domain when determining bound redundancy and bound feasibility by limiting a search for one or more bounds to a bound found to be associated with a current sample index interval and limiting the search for the one or more bounds to only active sets of bounds of the tree node.

20. A computer program product for topological planning with bounds representation, comprising at least one non-transitory computer-readable medium including one or more instructions that, when executed by at least one processor, cause the one or more processors to:
 receive map data and sensor data associated with a plurality of constraints in a geographic area;
 expand a topological tree by adding a plurality of nodes to represent a plurality of actions associated with the plurality of constraints, by a process comprising:
  generating a bound based on a constraint of the plurality of constraints, each constraint of the plurality of constraints specifying a semantic action for traversing an object in a roadway in the geographic area, and the bound identifying at least one of a longitudinal spatial limit and a lateral spatial limit with respect to an action for navigating an autonomous vehicle relative to the constraint; and
  linking the bound and one or more additional bounds sharing a common constraint in the plurality of nodes of the topological tree; and
 generate instructions based on the topological tree, to navigate the plurality of constraints.

* * * * *